United States Patent [19]

Black et al.

[11] 4,226,542
[45] Oct. 7, 1980

[54] CEMENT SLURRY RECLAMATION SYSTEM AND METHOD

[75] Inventors: Melvin L. Black; Robert C. Bowen, both of Pacifica, Calif.

[73] Assignee: Weigh-Tech, Inc., Pacifica, Calif.

[21] Appl. No.: 27,328

[22] Filed: Apr. 5, 1979

[51] Int. Cl.³ .............................................. B28C 7/04
[52] U.S. Cl. .................................... 366/17; 366/1; 366/8; 366/18; 366/40
[58] Field of Search ........................ 366/17, 1, 40, 8, 9, 366/10, 11, 12, 13, 14, 15, 16, 17, 18, 19, 20, 21, 26, 27, 28, 29, 30, 38

[56] References Cited

U.S. PATENT DOCUMENTS

| | | | |
|---|---|---|---|
| 3,004,544 | 10/1961 | Guptill | 366/17 |
| 3,083,423 | 4/1963 | Hartley | 366/17 |
| 3,300,193 | 1/1967 | Badgett | 366/8 |
| 3,379,421 | 4/1968 | Putman | 366/18 |
| 3,593,966 | 7/1971 | Munroe | 366/40 |

Primary Examiner—Edward J. McCarthy
Attorney, Agent, or Firm—Townsend and Townsend

[57] ABSTRACT

A slurry reclamation system for use with a concrete ready-mix plant which enables 100% reclamation of the constituents of concrete mix returned to the plant site by vehicles.

Returned concrete mix is dumped into an inlet hopper having a screw classifier for removing aggregate and coarse sand, and a weired channel enabling gravity flow of the water, cement fines and sand fines constituents into a slurry vessel. The slurry in the vessel naturally separates into clarified water and concentrated slurry, and agitators are provided for periodically stirring up the slurry to maintain the cement fines active. The slurry vessel is sized in such a manner as to guarantee complete consumption of slurry returned during a day's production by the end of the following production day, the volumetric capacity of the vessel being related to the total average volume of water used to produce fresh concrete during a representative production day.

An autochangeover unit automatically switches the water supply to truck washout stations and the screw classifier between normal plant supply water and the clarified water in the vessel, depending upon the level of the latter.

The system enables substitution of slurry for cement fines alone, sand alone, water alone, or any combination of these concrete constituents in accordance with the percent activity of the cement fines in the slurry and production demand.

61 Claims, 27 Drawing Figures

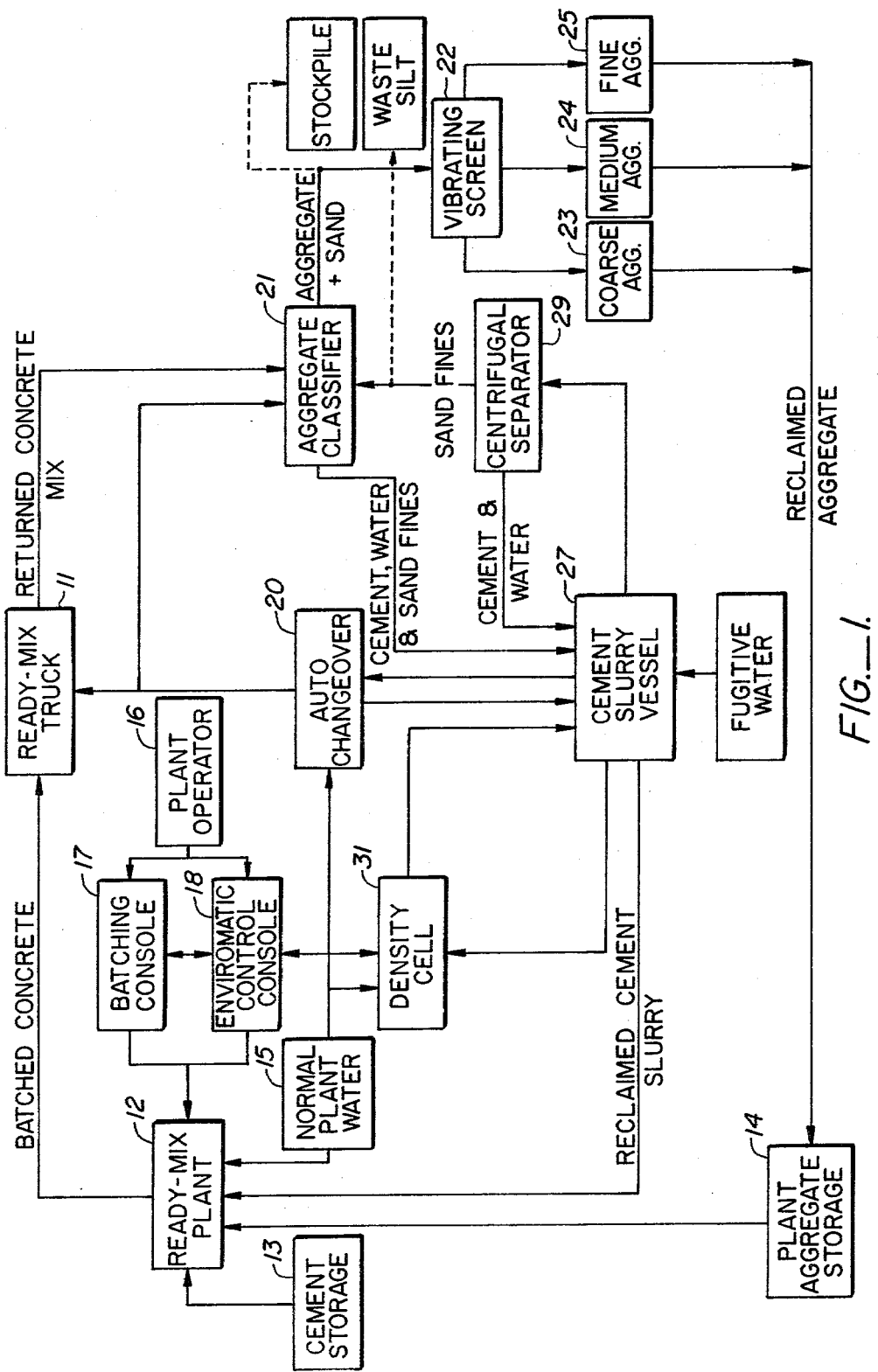
FIG._1.

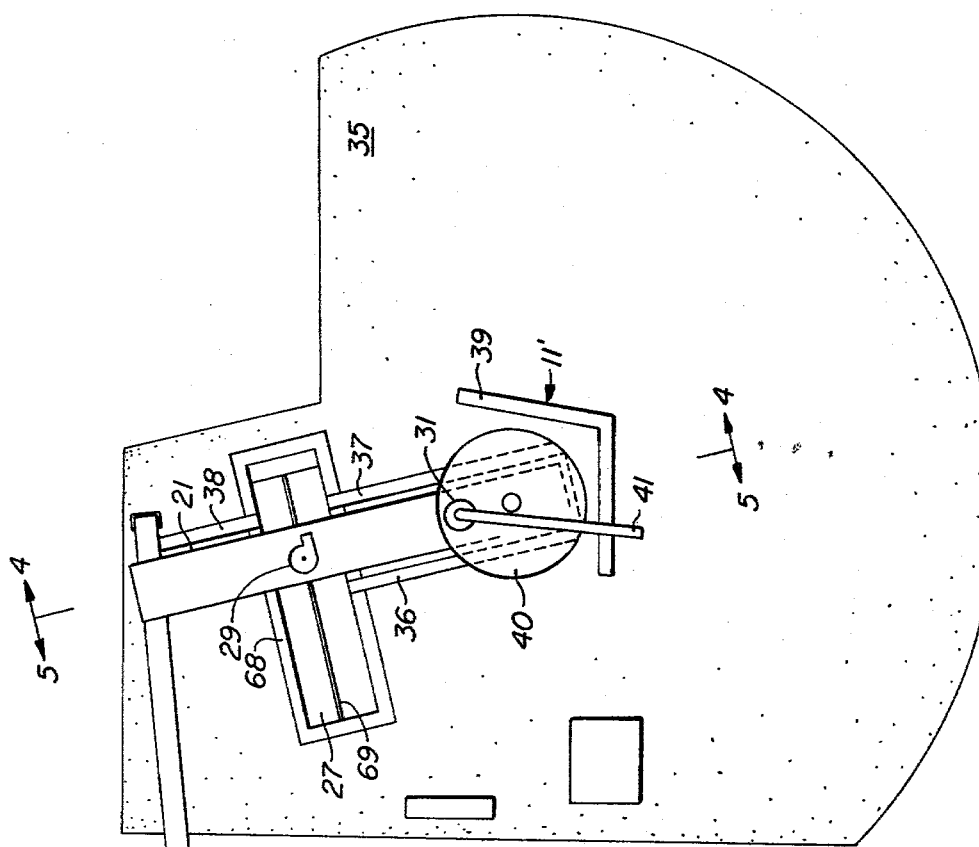
FIG._2.

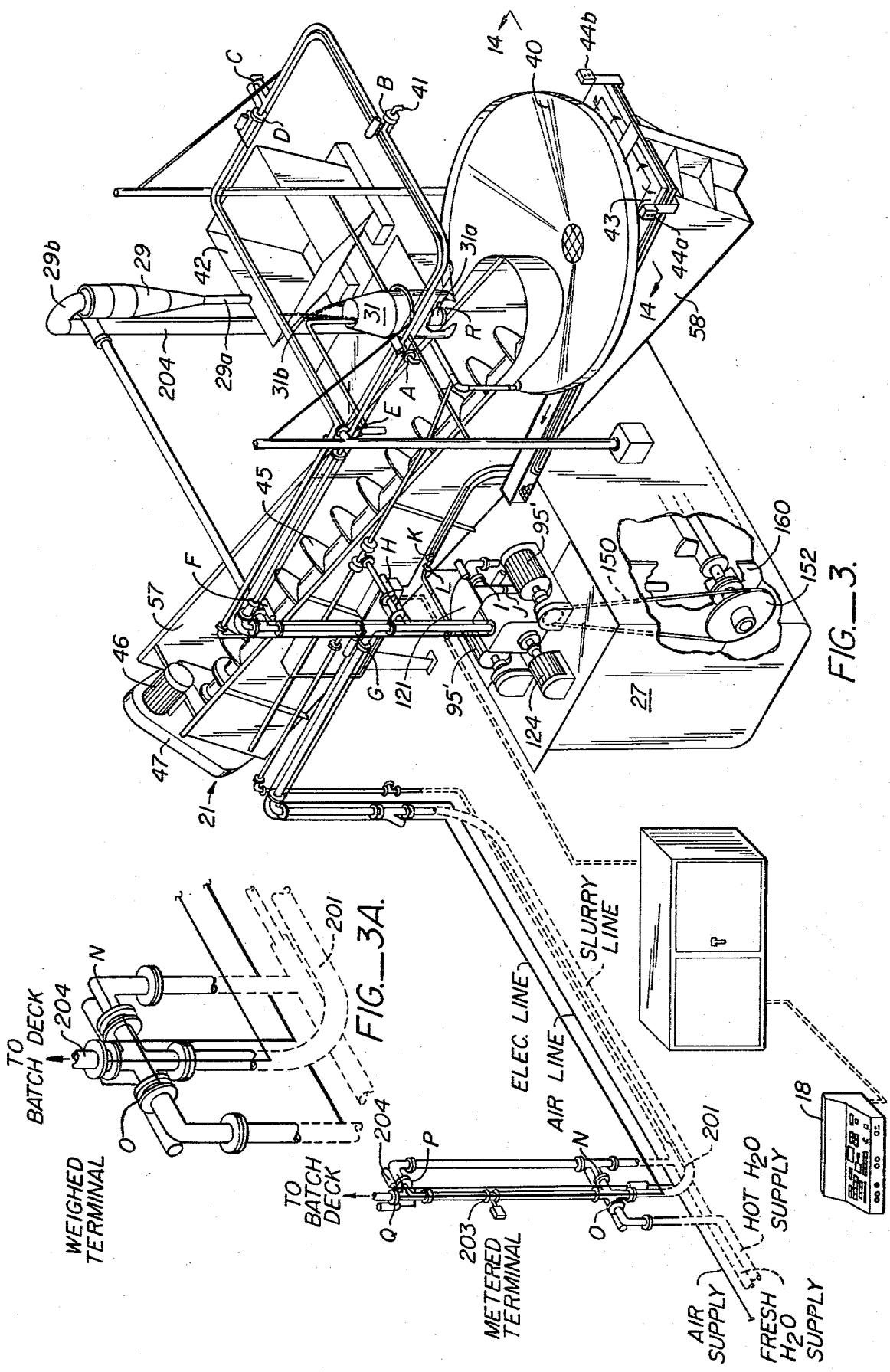

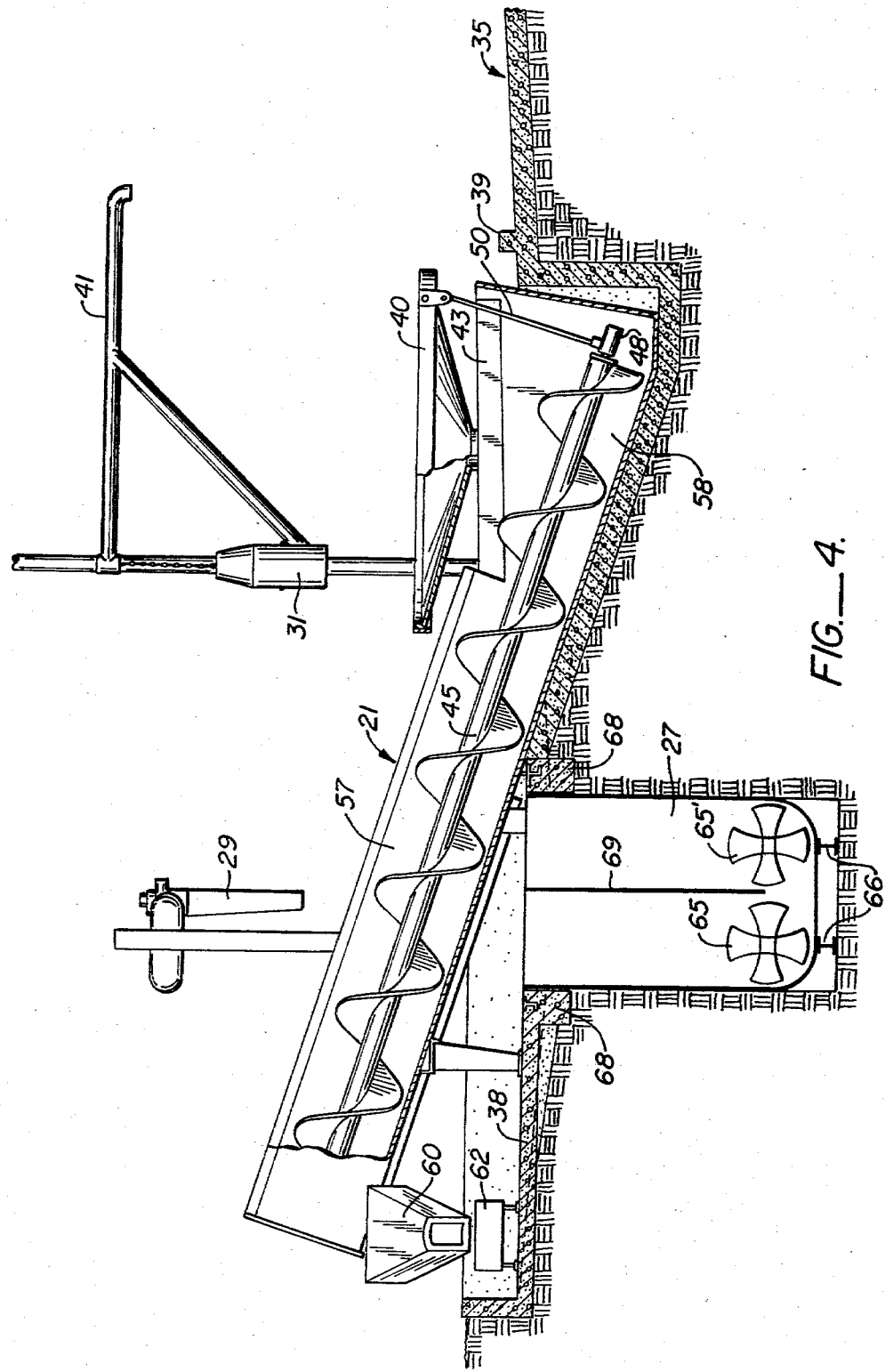
FIG._4.

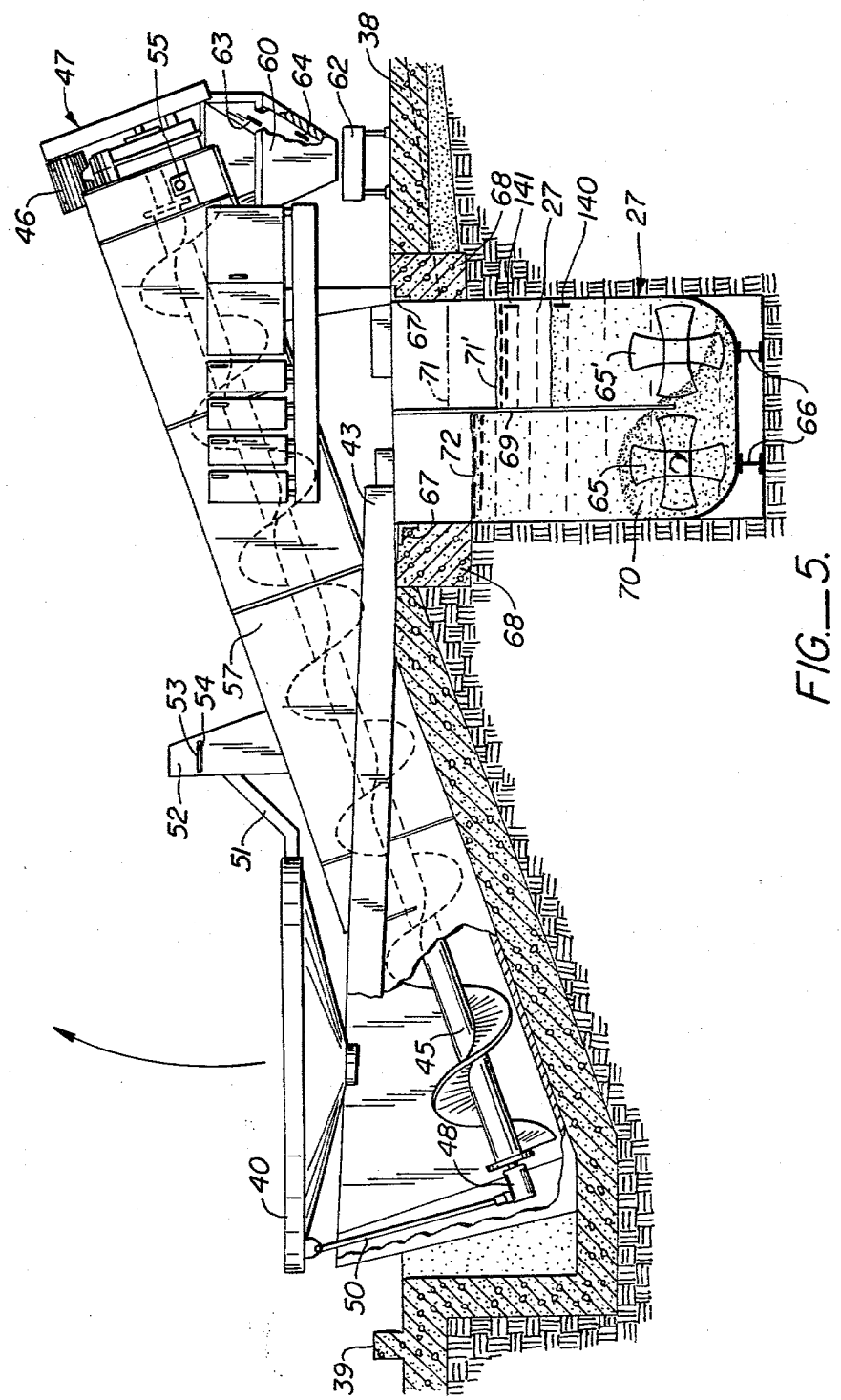
FIG._5.

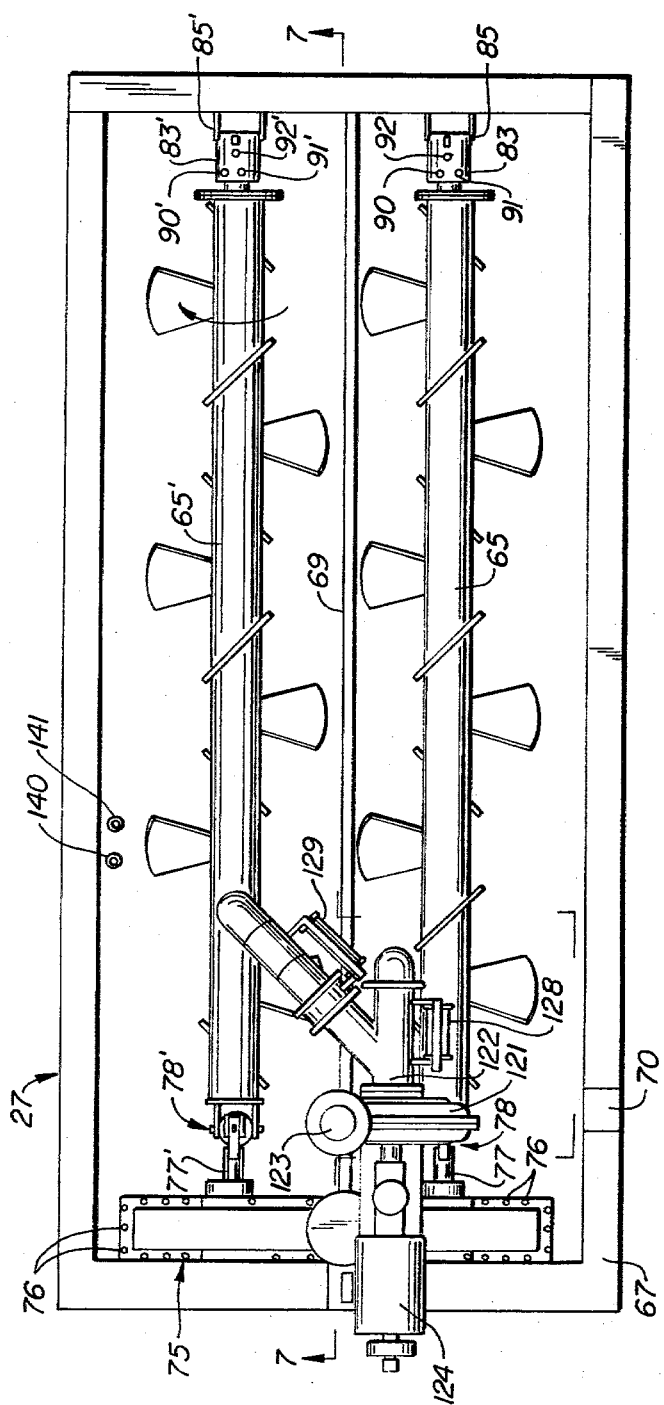

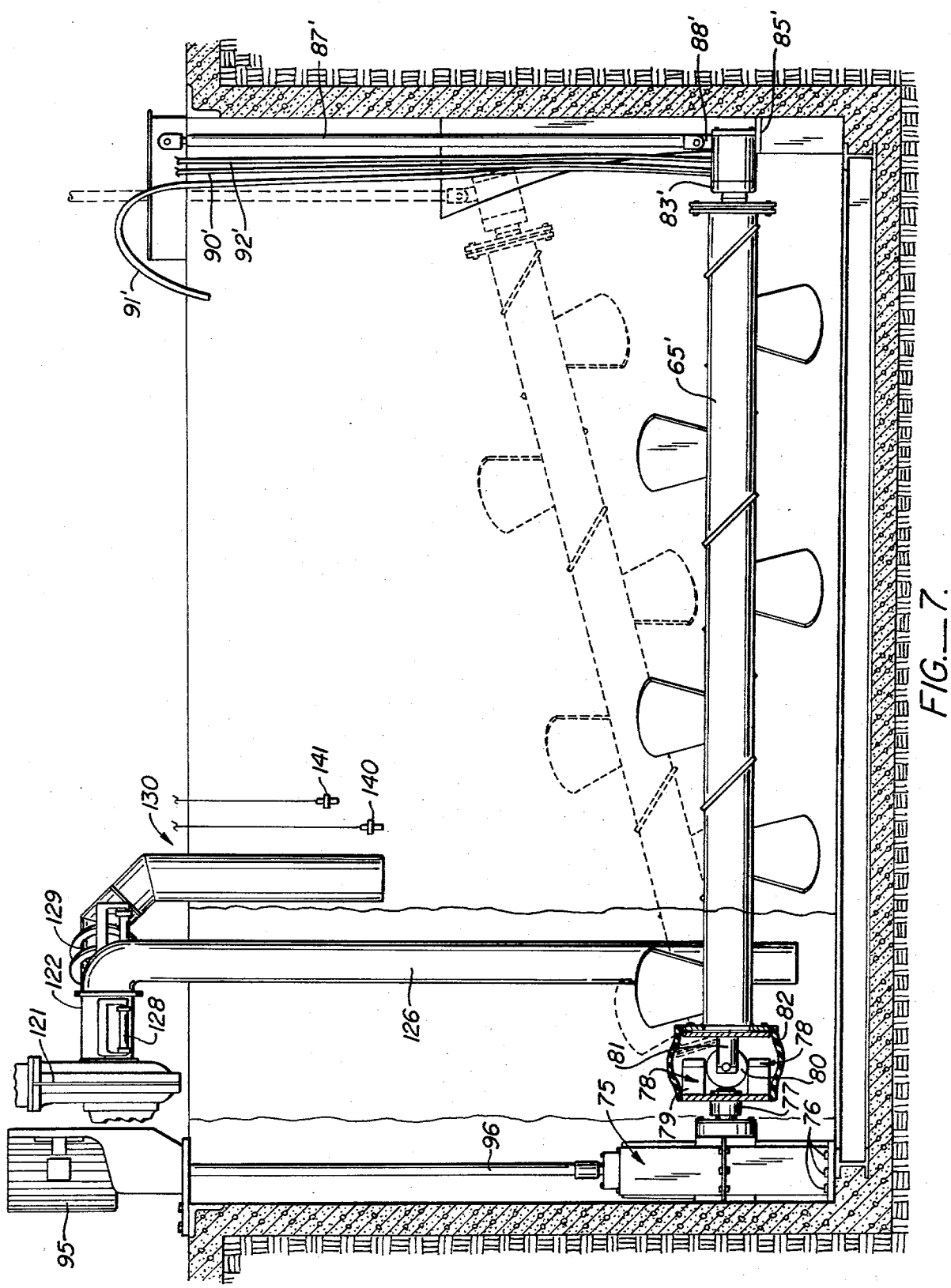
FIG._7.

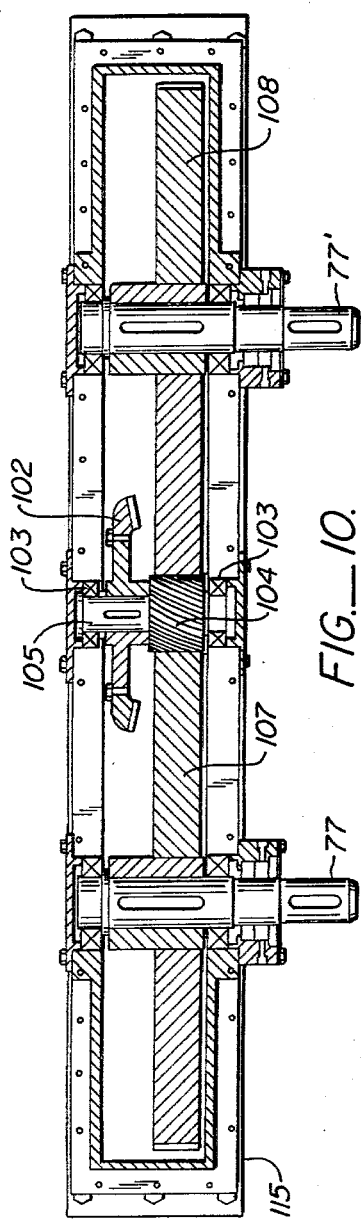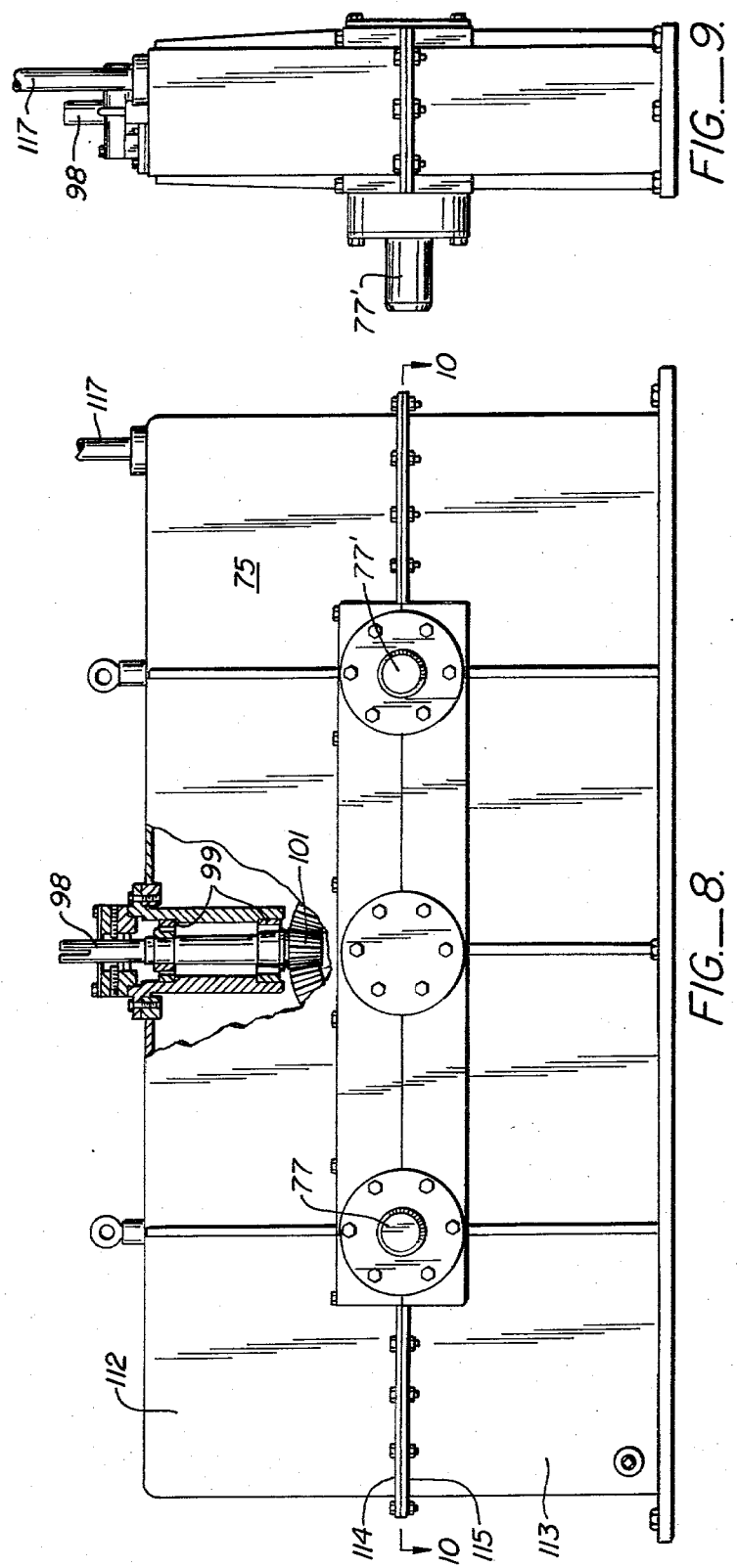

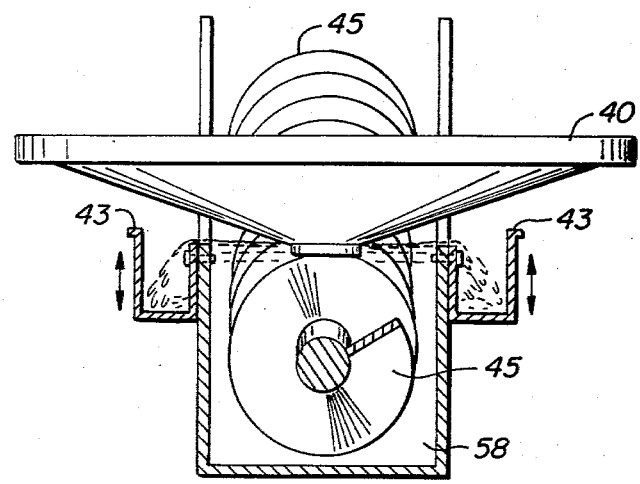
FIG._14.
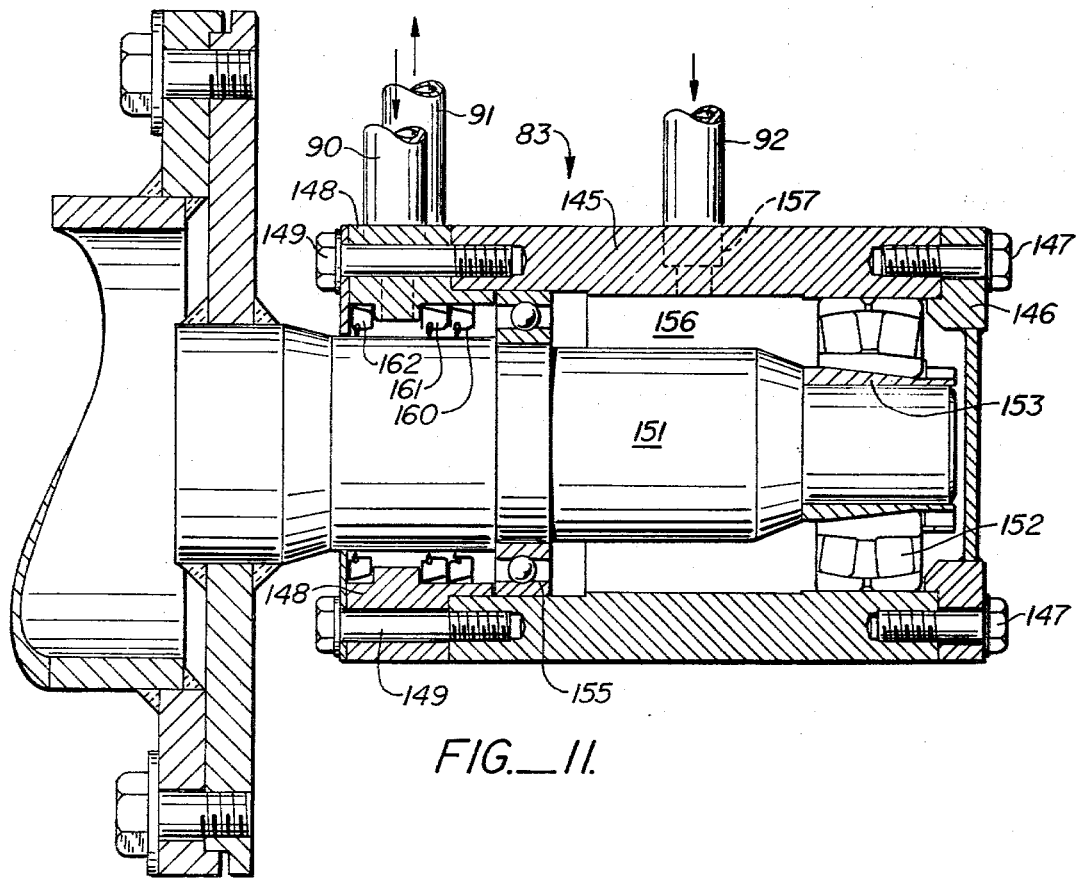
FIG._11.

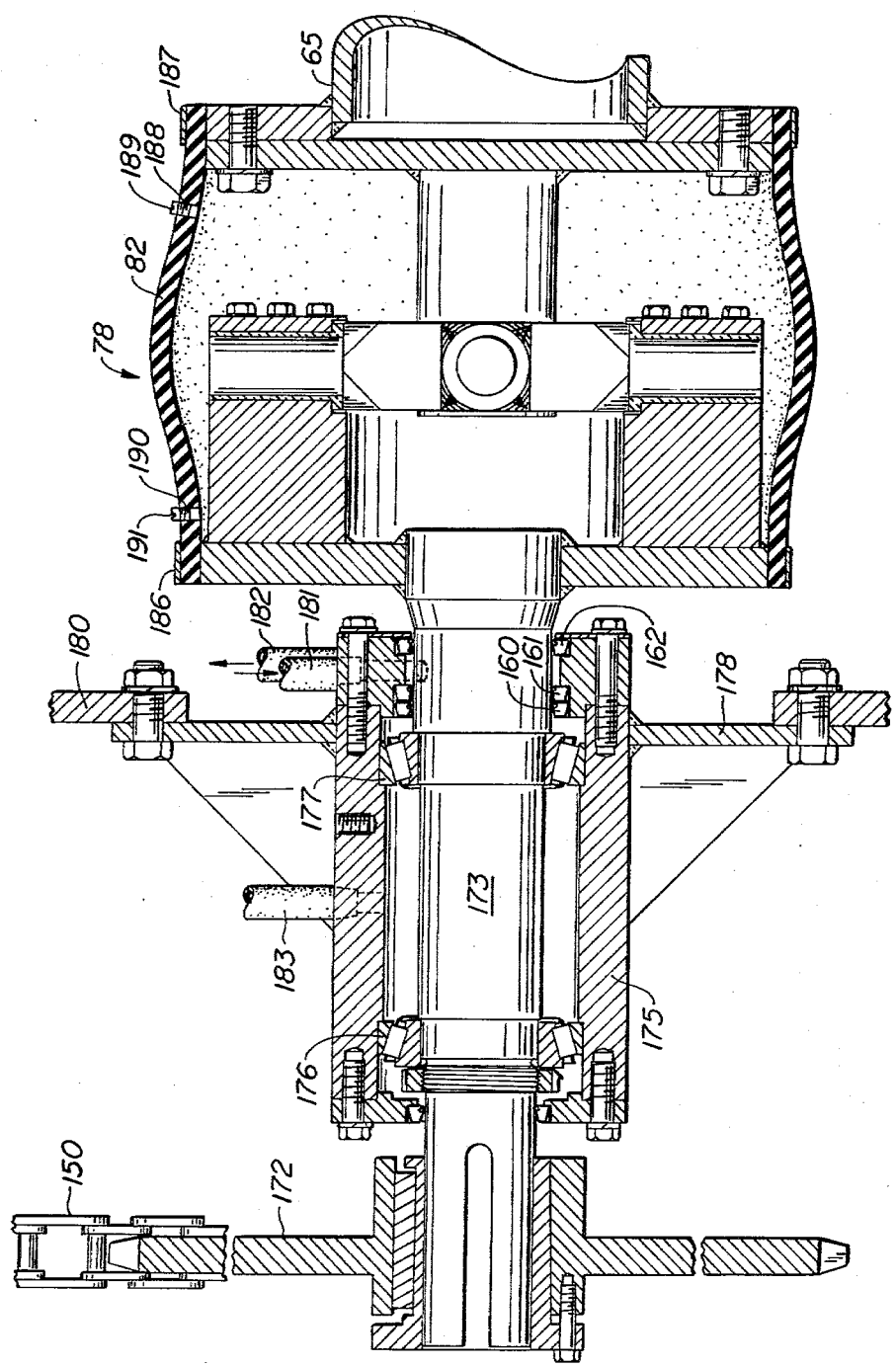
FIG._12.

| OPERATION | MODE | A | B | C | D | E | F | G | H | I | J | K | L | M | N | O | P | Q | R | AG 65 | AG 65' | SCREW MOTOR 46 | PUMP MOTOR 124 |
|---|---|---|---|---|---|---|---|---|---|---|---|---|---|---|---|---|---|---|---|---|---|---|---|
| WASHOUT TRUCK STATION #1 | NORMAL H₂O | X |   |   | X |   |   |   | X |   |   |   |   |   |   |   |   |   |   |   |   | X |   |
|   | CLARIFIED H₂O | X | X |   |   |   |   |   | X | X | X | X |   |   |   |   |   |   |   |   |   | X | X |
| WASHOUT TRUCK STATION #2 | NORMAL H₂O |   |   | X |   |   |   |   | X | X | X | X |   |   |   |   |   |   |   |   |   | X |   |
|   | CLARIFIED H₂O |   |   | X | X |   |   |   | X | X | X | X |   |   |   |   |   |   |   |   |   | X | X |
| WASHOUT TRUCK STATION #3 | NORMAL H₂O |   |   | X | X |   |   |   | X | X | X | X |   |   |   |   |   |   |   |   |   | X |   |
|   | CLARIFIED H₂O |   | X |   |   |   |   |   | X | X | X | X |   |   |   |   |   |   |   |   |   | X | X |
| AUTO. AGITATOR RUN 24 HR. | RECLAIM |   |   |   |   |   |   |   |   |   |   |   | X |   |   |   |   |   |   | 30 SEC. ON 1 HR. OFF |   |   |   |
|   | WASHOUT |   |   |   |   |   |   |   |   |   |   | X | X |   |   |   |   |   |   |   | X |   |   |
| MANUAL AG. 1 RUN |   |   |   |   |   |   |   |   |   |   |   |   | X |   |   |   |   |   |   | X |   |   |   |
| MANUAL AG. 2 RUN |   |   |   |   |   |   |   |   |   |   |   |   |   |   |   |   |   |   |   |   | X |   |   |
| AUTO. SCREW RUN 24 HR. |   |   |   |   |   |   |   |   |   |   |   |   |   |   |   |   |   |   |   |   |   | 30 SEC. ON 6 HR. OFF |   |
| MANUAL SCREW RUN |   |   |   |   |   |   |   |   |   |   |   |   |   |   |   |   |   |   |   |   |   | X |   |
| FILL DENSITY CELL |   |   |   |   | X |   |   |   |   | X |   |   | X |   |   |   |   |   |   | X |   |   | X |
| DUMP DENSITY CELL |   |   |   | X | X |   |   |   |   |   |   |   |   |   |   |   |   |   | X |   |   |   |   |
| FLUSH DENSITY CELL |   |   |   |   |   |   |   | X |   | X | X | X |   |   |   | X | X |   |   | X |   |   | X |
| SLURRY RECLAIM BATCH |   |   |   |   |   |   |   |   |   |   |   | X | X |   | X |   | X |   |   | X | X |   |   |
| NORMAL H₂O BATCH |   |   |   |   |   |   |   |   |   |   |   |   |   |   |   |   | X |   |   |   |   |   |   |
| HOT H₂O BATCH |   |   |   |   |   |   |   |   |   |   | X | X |   |   |   |   |   | X |   | X |   |   |   |
| HYDROCYCLONE OP. |   |   |   |   |   |   | X | X |   |   |   | X |   |   |   |   |   |   |   | X | X |   | X |
| SLURRY TANK DRAIN |   | X | X | X |   |   |   |   |   |   |   |   |   |   |   |   |   |   |   |   |   |   |   |
| BACKFLUSH STAGE 1 |   |   |   |   |   |   |   | X | 3 |   |   |   |   |   |   |   |   |   |   |   |   |   |   |
| BACKFLUSH STAGE 2 |   |   |   |   | X | 5 |   |   | 2 | 1 |   |   |   |   |   |   |   |   | 6 |   |   |   |   |
| MAKE UP SLURRY VESSEL |   |   |   |   |   |   |   | X |   |   |   |   |   |   |   |   | X |   |   |   |   |   |   |

FIG.—13.

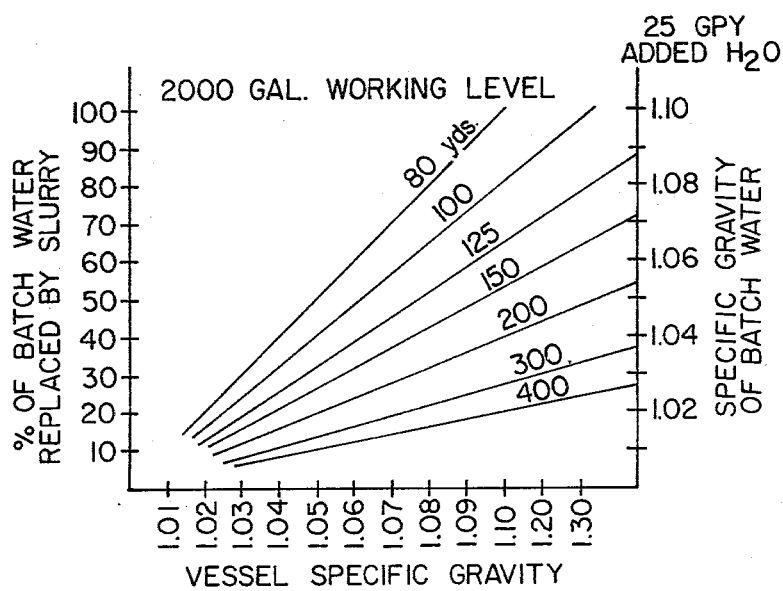
FIG._15A.
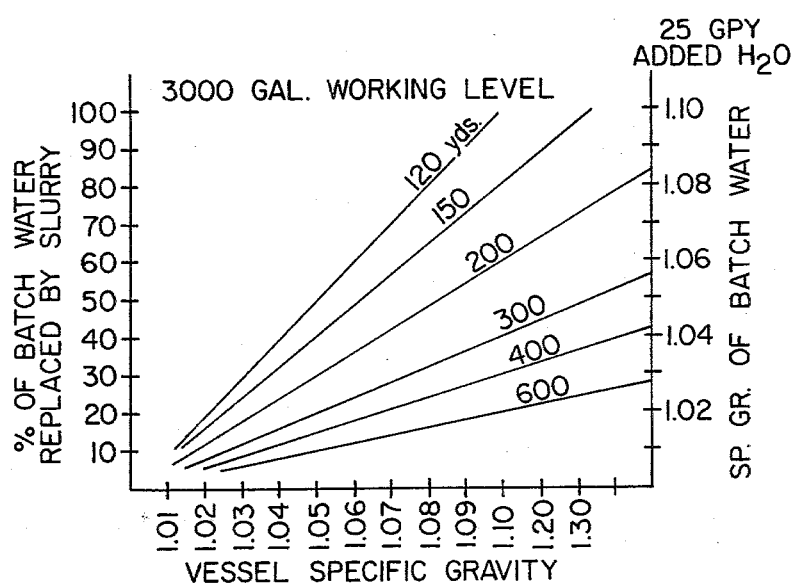
FIG._15B.
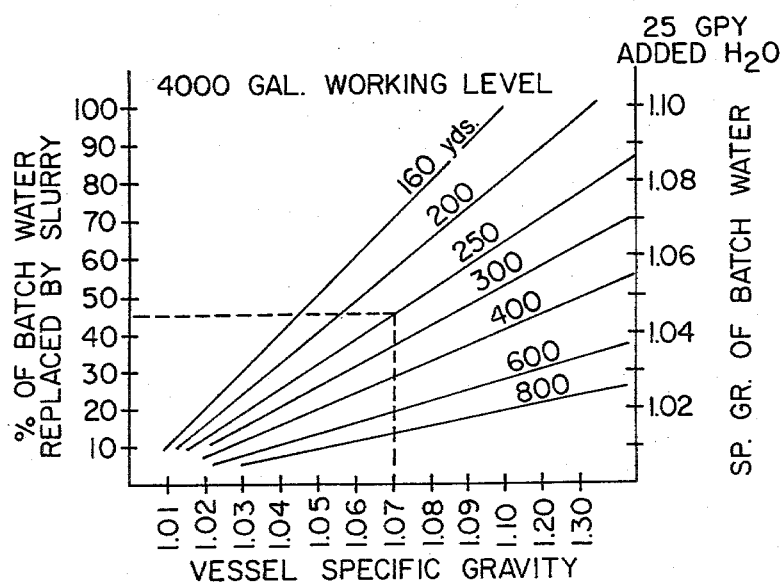
FIG._15C.

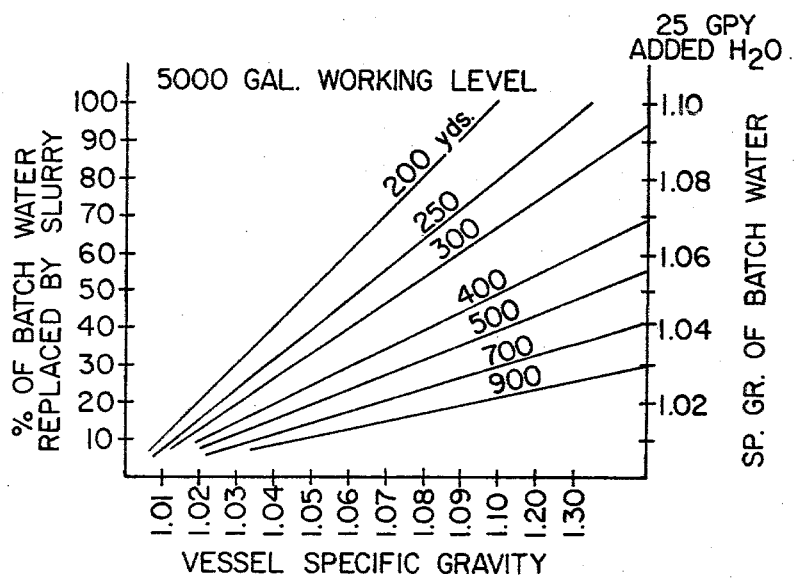
FIG._15D.
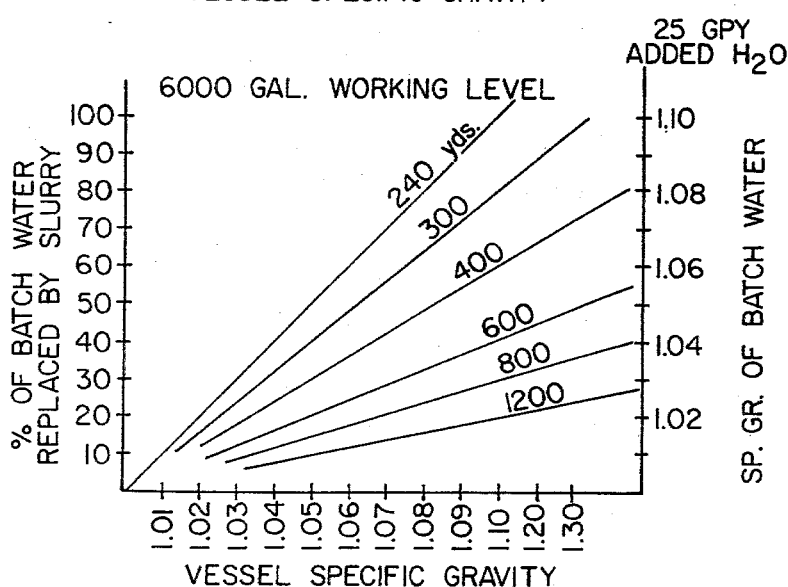
FIG._15E.
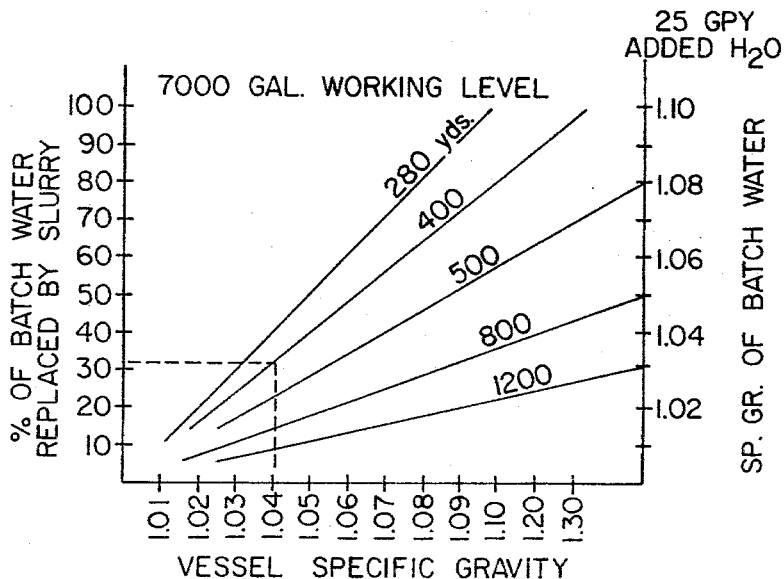
FIG._15F.

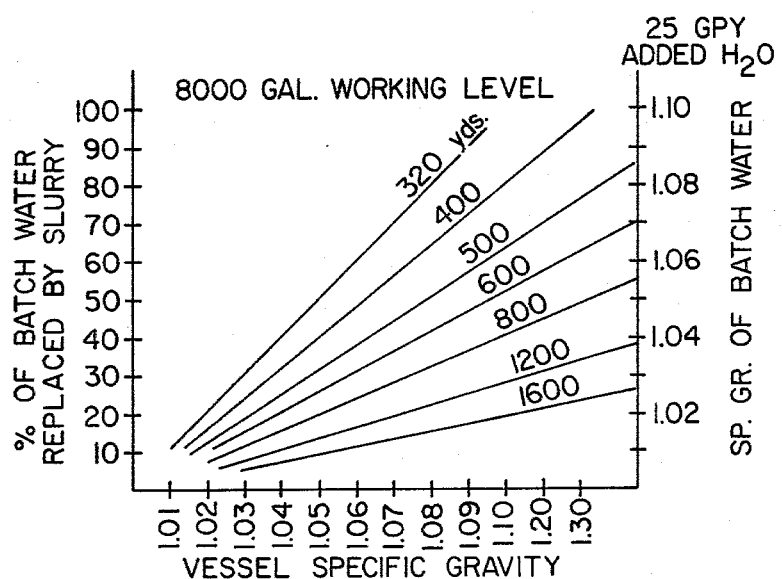
FIG.\_15G.
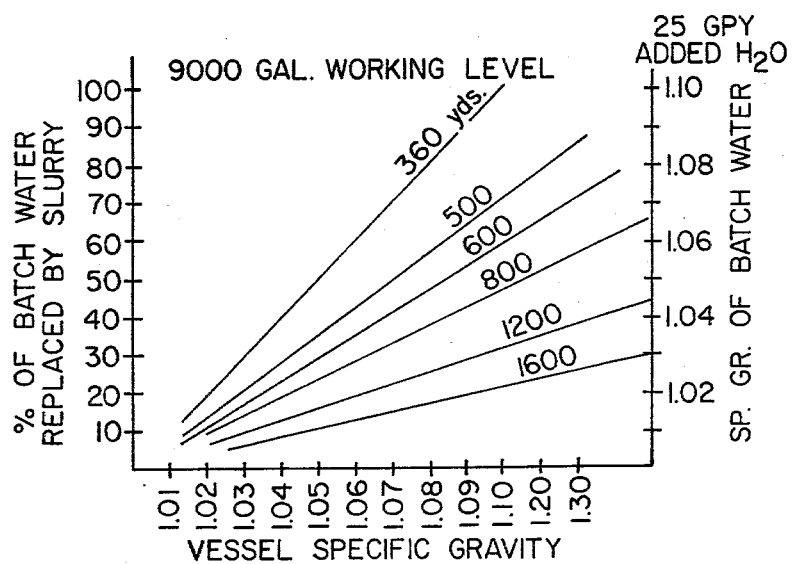
FIG.\_15H.
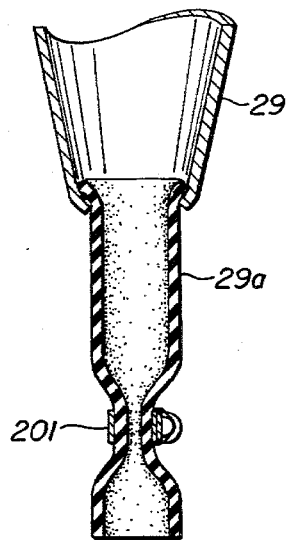
FIG.\_17.

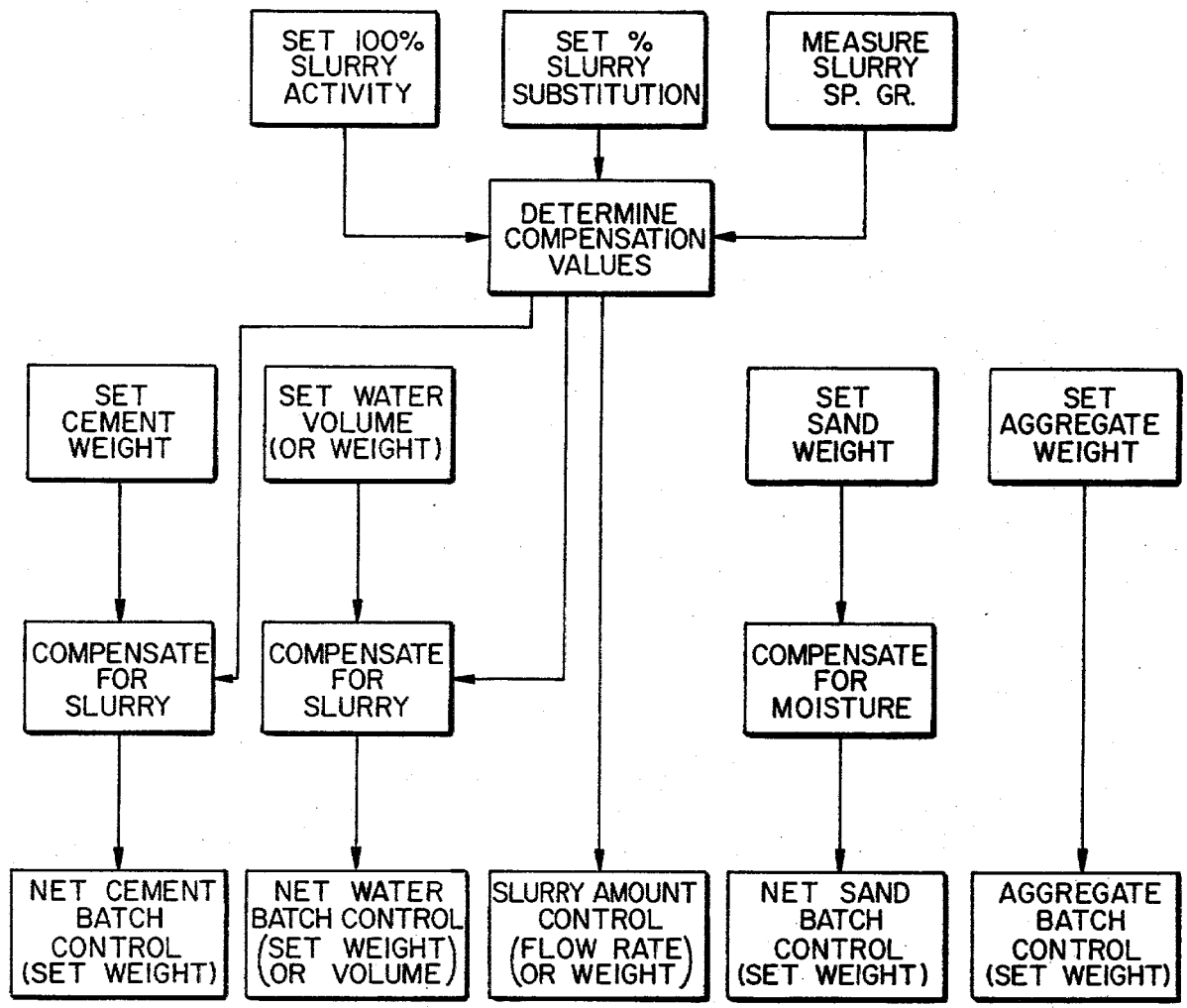
FIG._16A.

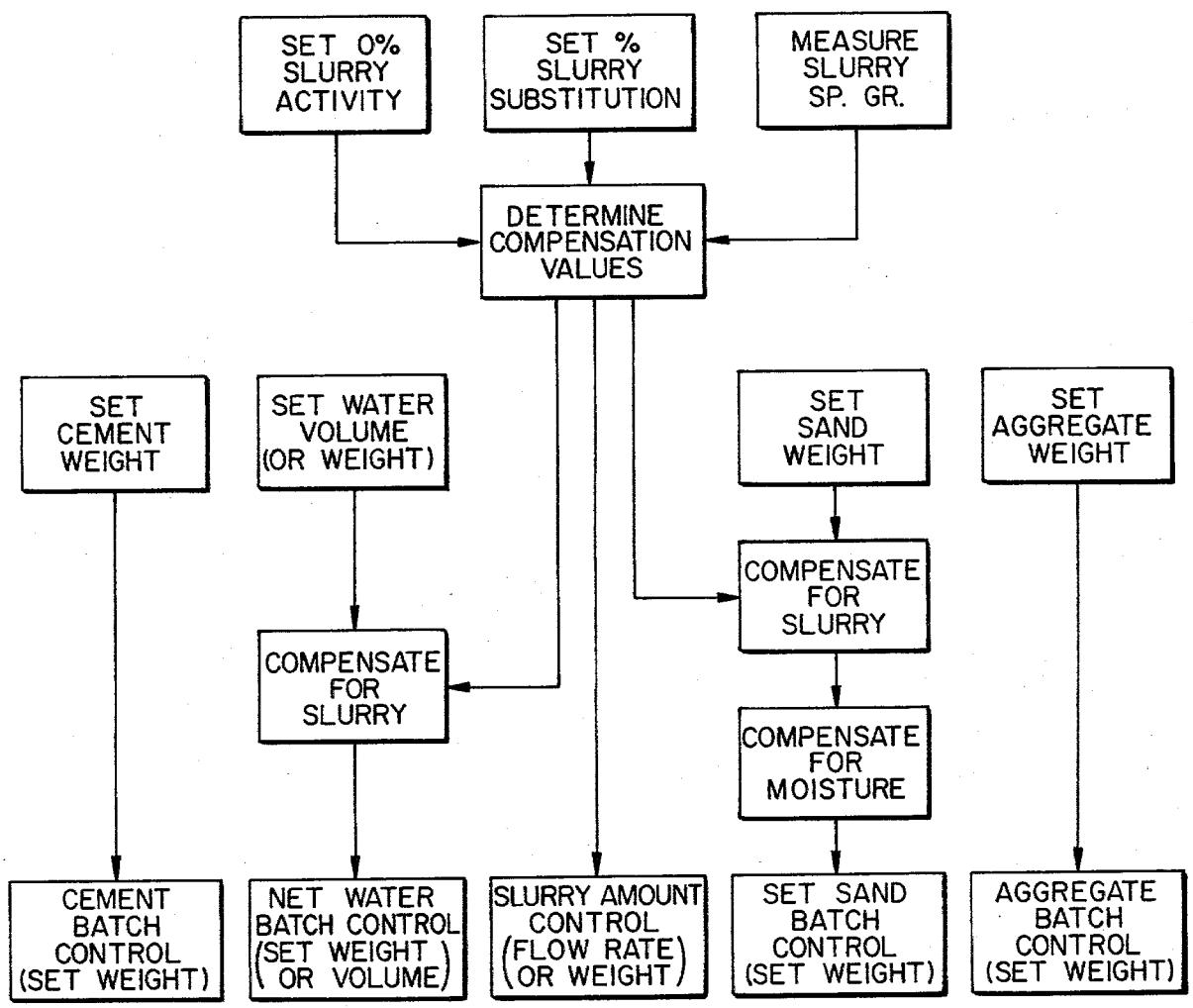
FIG._16B.

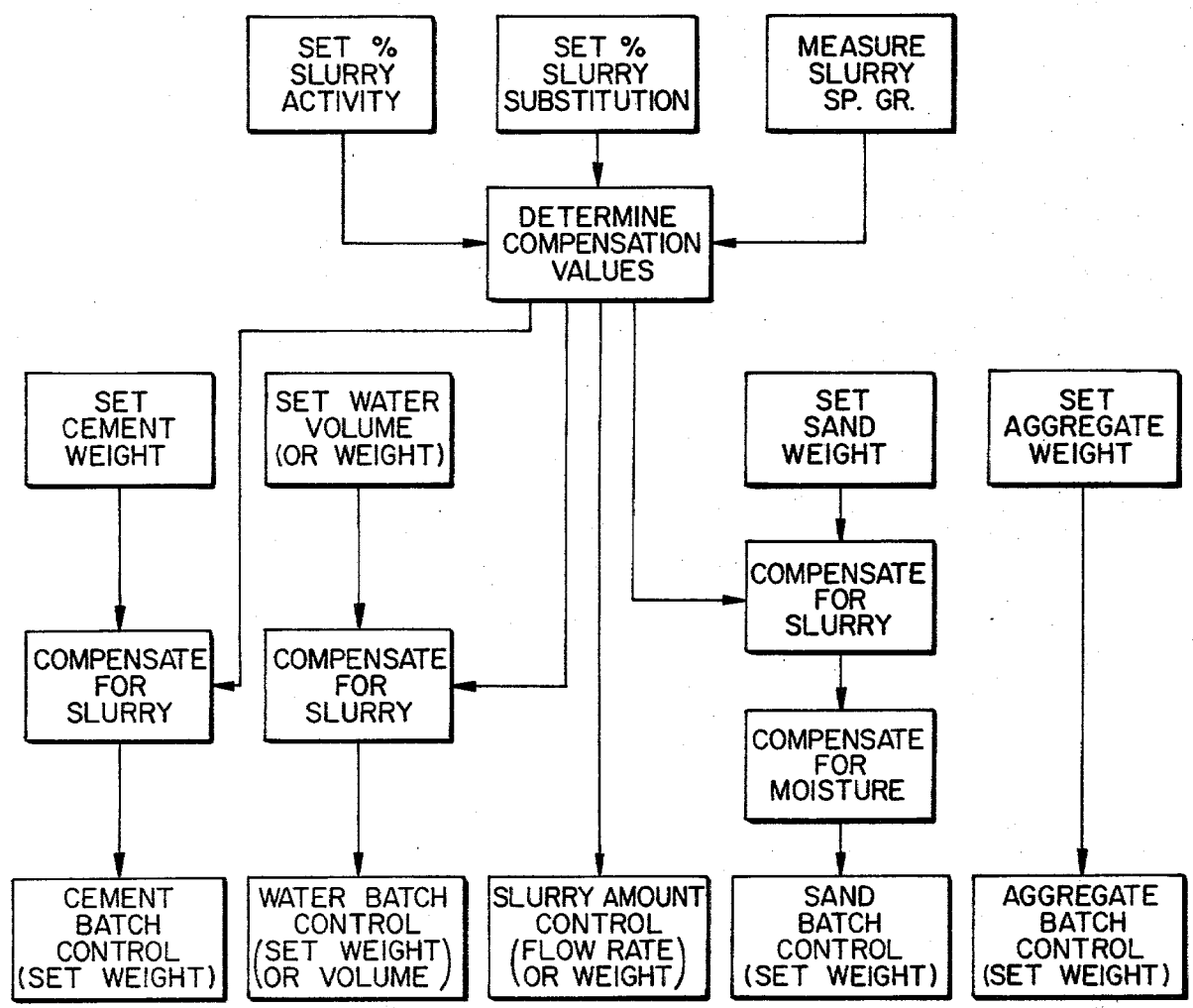
FIG._16C.

CEMENT SLURRY RECLAMATION SYSTEM AND METHOD

BACKGROUND OF THE INVENTION

This invention relates to methods and systems for concrete fabrication. More particularly, this invention relates to methods and systems for reclaiming concrete mix returned to a ready-mix plant by concrete trucks in the course of a day's production.

Concrete batch fabrication plants are well known and typically consist of a source of plant water and storage bins for storing fresh cement powder, and aggregates of various sizes to be admixed to the cement powder and water when a batch of concrete is required. The mixing operation is typically done either manually or automatically in a plant termed a "ready-mix" plant under the control of an operator or a computerized batching console by selecting the proportions of the various constituents to be admixed. In the latter type of installation, the batching console is monitored by a plant operator. Fresh batched concrete mix is dispensed into one or more waiting trucks each having a revolving drum which is used to transport the fresh batched concrete mix to one or more job sites for pouring. After a pour has been made, each truck typically returns to the concrete fabrication yard where a fresh batch of concrete is poured into the truck mixing drum for transportation to the job site. This cycle continues throughout the production day, or until no more fresh concrete mix is required at any of the job sites. At the end of a production day, each truck is finally washed out to remove the accumulated deposits within the mixing drum and parked until the next production day.

For years, the concrete remaining in a returning truck was simply dumped in the yard, permitted to harden and later hauled away for use as land fill. However, this arrangement was found to be extremely wasteful in that reusable aggregate constituents of the returned concrete were thrown away. In addition, the dumping of returned concrete in a yard was found to be environmentally unsound. Accordingly, installations were designed for the purpose of attempting to reclaim portions of the returned cement mix and to provide a less environmentally damaging operation. Such installations employed large drag tanks into the inlet end of which the returned concrete is dumped from a returning truck, the drag tanks having continuously operated drag chains and separate sedimentation chambers for assisting in the separation of the returned concrete constituents and clarification of the water portion thereof. While representing an improvement, drag tank installations were found to require relatively large amounts of electrical power to operate, were found to suffer from mechanical bearing failures due to the heavy loads involved, were expensive to install and maintain, and produced unsightly residue piles of fine sand and "spent" cement residue which eventually had to be hauled away to a fill site.

As an improvement over drag tank installations, slurry recirculation installations were designed to provide aggregate and cement slurry reclamation with less environmentally contaminating effect. In such installations, the returned aggregates are separated by a screw classifier from the remaining constituents (the slurry), sized and stored for later reuse; while the slurry is recirculated through large storage tanks, or continuously agitated in large above ground storage tanks, diluted with fresh water from the plant site, and added back to some of the freshly batched concrete mix. Such systems, while less environmentally damaging than the drag tank type installation, suffer from the disadvantages of requiring exceedingly large storage silos for the slurry, continuous consumption of large amounts of electrical power in order to recirculate the slurry, and extensive cost in erecting the silos and the associated plumbing. In addition, since the age of the slurry cannot be accurately determined, the effect on the freshly batched concrete mix of adding the slurry cannot always be predicted with certainty, and thus the structural characteristics possessed by the hybrid concrete mix cannot always be determined so that such hybrid concrete mix may only be legitimately used for limited, predominantly non-structural, purposes.

SUMMARY OF THE INVENTION

The invention comprises a low volume-high density method and system for reclaiming returned concrete mix which is relatively inexpensive to install and maintain, requires only extremely small amounts of power to operate, requires only a small amount of space for installation, is environmentally clean, and which provides for substantially 100% reclamation of the constituents of the returned concrete mix.

From a general system standpoint, the invention comprises an aggregate screw classifier for removing aggregates from concrete mix returned during a given production period (e.g., one day's production), a minimum sized slurry vessel for receiving the returned concrete mix less aggregates, means for determining the specific gravity of the slurry, and means for withdrawing the slurry from the vessel for admixture to fresh cement mix at a rate selected in accordance with the specific gravity so that substantially all the slurry in the vessel is consumed within the next succeeding production period. The vessel, which is sized in accordance with the average production volume of a given concrete fabrication yard, is designed to have a volumetric capacity capable of accommodating a predetermined fraction of the total average volume of water used to produce fresh concrete during the production period of the concrete fabrication yard, the predetermined fraction being less than 1.0 and preferably in the range from about 1/5 to $\frac{1}{2}$.

The means for sensing the specific gravity of the slurry can be either a static or dynamic sensing device. In the preferred embodiment of the static specific gravity sensor, a pipe housing having a volumetric capacity of one hundred pounds of water is coupled by suitable valve means to a fresh water source and to the slurry vessel, and the pipe housing is connected to a load cell for measuring the weight of the housing plus contents. To calibrate, the pipe housing is simply filled with water, and the reading on an associated meter adjusted to read one hundred. To measure slurry specific gravity, the pipe housing is filled with slurry from the slurry vessel, the meter reading is observed, and the specific gravity value is taken directly from the meter reading by inserting a decimal point to the right of the hundreds digit, either by operator interpolation or by causing a decimal point to be illuminated on the meter.

The system further includes means for sensing the level of the liquid in the slurry vessel and autochangeover means for supplying fresh water from the normal plant water source to an associated washout station for returning trunks and to the aggregate screw classifier whenever the liquid falls below a predetermined minimum level and for supplying clarified water from the slurry vessel to the washout station and screw classifier whenever the liquid level is above a predetermined higher level; and means for periodically agitating the slurry in the vessel for a predetermined duration, the period of slurry agitation preferably being approximately once every hour and the duration of slurry agitation being approximately thirty seconds.

The agitating means includes mechanical drive means having an output drive shaft, at least one agitator shaft positioned within the slurry vessel and having an axis extending along the vessel, the agitator shaft having a driven end, a freely rotatable end and a square cross sectional shape, and tiltable bearing means coupled to the output drive shaft and the driven end of the agitator shaft for enabling transfer of mechanical power from the drive means to the agitator shaft. The square shape of the agitator shaft provides a velocity gradient during operation which prevents slurry build-up on the agitator shaft surfaces and affords more efficient operation. The tiltable bearing means, which preferably comprises a spherical universal joint, enables the freely rotatable end of the agitator shaft to be raised from and lowered to a normal operating position whenever maintenance is required and, in the event of a prolonged power failure, whenever the slurry in the bottom of the vessel achieves a viscosity so great that agitator rotation is impossible. The tiltable bearing means is provided with a flexible seal to contain a lubricant and to prevent the slurry in the tank from contaminating the bearing elements.

The agitator is provided with tail bearing means coupled to the freely rotatable end thereof, the tail bearing means being supported by a support shelf coupled to the inside of the vessel at the termination of the tail end of the agitator shaft, the support means further including guide means extending generally vertically of the vessel for confining the path of the freely rotatable end of the agitator shaft during raising and lowering.

The agitator tail bearing is both oil cooled and lubricated from above the surface of the vessel for convenience, and includes a fluid seal assembly for preventing the slurry in the tank from contaminating the internal bearing surfaces. The fluid seal assembly includes an internal bearing flush volume to which flexible bearing inlet and outlet water conduits are coupled, and the integrity of the bearing seals can be monitored by simple visual inspection of the outlet conduit bearing flush water above the surface of the slurry vessel.

A similar tail bearing arrangement is provided for the aggregate screw classifier, which is pivotally mounted at its upper end to enable rapid removal of the screw for maintenance and inspection.

Two alternate agitator mechanical drive means are provided, both powered by motor means mounted on top of the slurry vessel. A first drive means includes a dual gear train drive means mounted in the bottom of the slurry vessel and coupled to the output shaft of a single motor by means of a single drive shaft, the drive means including a casing, a pair of driven gears mounted for rotation about a spaced pair of parallel axes, one of the driven gear axes being coaxial with the agitator drive shaft, the corresponding one of the driven gears being coupled to the agitator drive shaft, a driving gear mounted for rotation about an axis perpendicular to the driven gear axes and coaxial with the drive shaft, and intermediate gear means coupled between the driving gear and the driven gears for enabling transfer of mechanical power therebetween. A second drive means includes a sprocket-bearing assembly mounted at the bottom of the slurry vessel and mechanically coupled to a motor by means of a flexible drive link, preferably a chain. In this embodiment, each agitator is provided with a separate motor and sprocket-bearing assembly. In both embodiments, output shaft bearings are provided which are oil cooled and lubricated from above the surface of the vessel, and shaft seals and water conduits are also provided for internal flushing, in a manner substantially identical to that described above for the agitator tail bearing assemblies.

The system optionally includes means for cycling the liquid in the slurry vessel through a centrifugal separator means at periodic intervals in order to remove accumulated sand fines, the separated sand fines being deposited in the aggregate classifier or in a separate hopper for separation, storage and later reuse, and the slurry-less sand fines-being returned to the slurry vessel.

In use, the specific gravity of the slurry in the vessel is periodically monitored with the density cell, and the slurry is pumped to the ready-mix plant for admixture to the fresh concrete mix constituents at a percentage rate determined by the slurry specific gravity and the scheduled or estimated production requirements. When the level of the liquid in the slurry vessel lies above the higher level, clarified water from the top of the slurry vessel is drawn off and used for truck washout and for operation of the aggregate classifier. When the level of the liquid in the vessel falls below the minimum level, water for truck washout and the aggregate classifier operation is automatically switched to the normal plant water supply until the liquid level rises to the first predetermined level, after which clarified water from the slurry vessel is again used as the water source.

The system is alternately configured for compatibility with either metered or weighed ready-mix batching installations. In the former type, the slurry flow to the batching components of the ready-mix plant is monitored by a flow meter, preferably a vortex shedding meter, which generates electrical signals representative of the slurry flow rate. In the latter type, the slurry is simply weighed at the ready mix plant and flow is terminated when the demanded amount of slurry has been delivered.

The system also enables controlled slurry flow to the ready-mix plant in accordance with the relative activity of the cement fines in the slurry, expressed as a percent activity or, alternatively, inertness in order to optimize the reclamation of the slurry without substantially impairing the strength and shrinkage characteristics of the concrete or altering the design mix.

The system also incorporates several automatic features to maximize efficiency of the operation. Operation of each agitator is disabled, e.g., during truck washout and operation of the classifier screw to prevent disruption of the clarified pool of water in the slurry vessel. An automatic back flush cycle provides for back flushing of appropriate conduits at the close of the production day. An automatic agitator delay cycle prevents any operation of the agitators for a predetermined period of time, ending after the last actual or predicted truck washout operation during the production period.

The system provides a highly efficient reclamation operation for returned concrete mix in which substantially all of the returned ingredients are reclaimed and reused. In addition, since the system is entirely closed, there are no exposed environmental contaminants. Further, the system requires a very small amount of working space and consumes relatively small amounts of electrical power.

For a fuller understanding of the nature and advantages of the invention, reference may be had to the ensuing detailed description taken in conjunction with the accompanying drawings.

BRIEF DESCRIPTION OF THE DRAWINGS

FIG. 1 is a block diagram of the preferred embodiment of the invention;

FIG. 2 is a top plan view of the preferred embodiment of the invention;

FIG. 3 is an isometric projection of the preferred embodiment of the invention;

FIG. 3A is a partial view showing an alternate embodiment for use with a weighed batching operation;

FIG. 4 is a sectional view taken along lines 4—4 of FIG. 2;

FIG. 5 is a side sectional view taken along lines 5—5 of FIG. 2;

FIG. 6 is a top plan view showing the slurry vessel in the preferred embodiment of the invention;

FIG. 7 is a sectional view taken along lines 7—7 of FIG. 6;

FIG. 8 is a front elevational view, partially broken away, illustrating a first embodiment of the vessel-mounted agitator drive unit;

FIG. 9 is an end elevational view of the agitator drive unit;

FIG. 10 is a sectional view taken along lines 10—10 of FIG. 8;

FIG. 11 is an enlarged sectional view illustrating a first embodiment of the agitator tail bearing construction;

FIG. 12 is a sectional view illustrating a second embodiment of the vessel-mounted agitator drive unit;

FIG. 13 is a table illustrating the configuration of valves and motor states for several modes of system operation;

FIG. 14 is an enlarged sectional view taken along lines 14—14 of FIG. 3;

FIGS. 15A—H are utilization charts illustrating percentage reclaimed slurry selection;

FIGS. 16A—C are flow charts illustrating the slurry reclamation process in accordance with relative slurry cement fine activity; and FIG. 17 is an enlarged sectional view of the sand outlet portion of centrifugal separator 29.

DESCRIPTION OF THE PREFERRED EMBODIMENTS

Turning now to the drawings, FIG. 1 illustrates the invention in block diagram form. As seen in this figure, a ready-mix truck station 11 is provided for loading of batched concrete from a ready-mix plant 12 to which mix materials are supplied from a cement storage unit 13, a plant aggregate storage unit 14 and a normal plant water supply unit 15, all under control of a plant operator normally located at a station 16 who controls a batching console 17 and a density controlling device 18. Plant 12 and cement storage units 13 and 14 may comprise any conventional arrangement known to those skilled in the art and found in ready-mix concrete yards. Similarly, the plant water supply unit 15 and batching console 17 are conventional units known to those skilled in the art. The density controlling device 18 is preferably an Enviromatic unit of the type sold by Weigh Tech, Inc. of Pacifica, California, and comprises a multifunction unit for controlling the amount of washout water supplied to a truck at station 11, for sequencing pump motors and other motors associated to the several system components described below at the concrete yard to minimize electrical power consumption, and for controlling back flushing of predetermined fluid conduits at the end of a production day.

The ready-mix truck station 11 is provided with truck washout water from an autochangeover unit 20, described below, which is also coupled to an aggregate classifier unit 21. Returned concrete mix from the ready-mix truck station 11 is also coupled to aggregate classifier unit 21, which preferably comprises a dewatering screw classifier of known design.

Aggregates and coarse sand separated from the aggregate classifier unit 21 are supplied via an optional vibrating screen unit 22, also conventional, to coarse, medium and fine aggregate temporary storage hopper 23–25, from which the separated and classified aggregate components are transported periodically to the plant aggregate storage unit 14 via any suitable means, e.g., separate conveyor belts. Alternatively, the separated aggregates may simply be stockpiled, as indicated by the broken line.

The returned concrete mix minus the separated aggregate and coarse sand is coupled from aggregate classifier unit 21 to a cement slurry vessel 27. Water is supplied to vessel 27 from the normal plant water unit 15 via autochangeover unit 20 and also by drainage of fugitive water (e.g., ground water from the truck washout operation, storm water and the like) into the vessel 27 by appropriate drain channels.

The slurry in vessel 27 is optionally periodically coupled to a centrifugal separator unit 29, preferably a commercially available hydrocyclone, in which sand fines are removed from the slurry and coupled to the aggregate classifier unit 21 for classification and storage. Alternatively, the sand fines can be dumped into an appropriate container, or stockpiled for later distribution or reprocessing. The remainder of the slurry is returned from the centrifugal separator unit 29 to the vessel 27.

Slurry from the vessel 27 is also coupled to a density cell 31 on demand from the plant operator at station 16. Density cell 31 may comprise any one of a number of known density measuring units capable of providing a static or dynamic density reading upon demand. One such unit is described below with reference to FIG. 3. Other suitable arrangements will occur to those skilled in the art.

The slurry in vessel 27 is also connected to the ready-mix plant 12 for use in concrete fabrication in the manner described below.

Autochangeover unit 20 performs two major functions in the system of FIG. 1: First, unit 20 controls the source of the supply of water to truck station 11 and aggregate classifier 21; second, unit 20 replenishes the supply of water in vessel 27 when the slurry has been emptied from vessel 27. More specifically, when the level of the liquid in vessel 27 lies below a predetermined minimum level, any demand at the truck station 11 for washout water is met by routing water from plant water unit 15 via unit 20 to the truck station 11. A similar routine is followed when a supply of water is required to aggregate classifier unit 21 during operation. When the level of the liquid in vessel 27 lies above a different predetermined higher level, water is supplied to the washout portion of truck station 11 and aggregate classifier unit 21 (as required) from vessel 27 via autochangeover unit 20. Unit 20 comprises automatically operated valves of standard design capable of altering the water flow paths in the manner noted above, as well as a pair of liquid level sensors, described below, located in the interior of vessel 27.

In addition, after the slurry has been completely emptied from vessel 27, unit 20 supplies fresh water to the vessel up to the predetermined maximum level. Also, in a special mode termed "Slurry Tank Make-Up", unit 20 supplies fresh water to vessel 27, which then functions as a buffer storage tank for supplying water to ready-mix plant 12 at a higher rate than that permitted by the normal (municipal) water supply.

General System Operation

In operation, at the beginning of each production day at the ready-mix yard, the plant operator at station 16 initiates operation of the ready-mix plant 12 by manipulating the various controls on the batching console 17. If fresh batched concrete is to be produced without the addition of any slurry from vessel 27, or if no slurry remains in the vessel 27, the batched concrete supplied to the ready-mix truck station 11 is fresh concrete produced from the proper mix of dry cement in storage unit 13, aggregate from storage unit 14 and water supplied from normal plant water unit 15. The fresh batched concrete is then supplied to the ready-mix truck station 11. As an empty truck becomes available, each truck is filled and driven to the job site where the truck is emptied. As each truck returns to the truck station 11, it is typically re-loaded with additional freshly-batched concrete. At the end of the production period, typically late in the afternoon, each truck returns to station 11 wherein the concrete mix residue is washed out and supplied to the aggregate classifier unit 21. During washout, either fresh water from the normal plant water unit 15 or clarified water from the vessel 27 is supplied to the truck station 11 via the autochangeover unit 20, depending on whether sufficient clarified water is present in vessel 27. This same water is also supplied to the aggregate classifier unit 21 to separate the cement and sand fines from the aggregates in the returned concrete mix.

The determination whether to supply water from the plant water unit 15 or the vessel 27 is automatically made by a pair of level sensors, noted above, located in vessel 27 and described more fully below.

The mixture of cement, water and sand fines from aggregate classifier unit 21 is coupled to the vessel 27; the returned aggregate and coarse sand from classifier unit 21 are deposited on a vibrating screen 22, in which the returned aggregate-sand combination is separated into two or more sizes depicted in FIG. 1 as coarse, medium and fine. After separation, the reclaimed aggregate is transported to the plant aggregate storage unit 14 for reuse.

The mixture of returned cement and sand fines, as well as the water, deposited in the vessel 27 is periodically cycled through optional centrifugal separator 29 in order to remove the sand fines therefrom. The remaining cement and water mixture is then returned to the vessel 27, while the sand fines are coupled to the classifier unit 21 for separation and reuse, or deposited as waste silt in a separate location.

When a slurry is present in the vessel 27 (as determined by the level probes) and when the plant operator opts to use reclaimed slurry in combination with fresh mix, the plant operator at station 16 initially measures the specific gravity of the slurry using density cell 31, and uses this figure to determine the percentage of slurry to be added to the fresh mix during production of any given particular batch of concrete. In addition to using the actual value of the specific gravity of the slurry, the scheduled quantity of cement to be batched during that day's production period (or the operator's estimate thereof) is also used to determine the percentage of reclaimed slurry to be added to the fresh mix, the object being to completely empty the slurry from vessel 27 before the end of the day's production period. In general, for high production periods, the slurry in the vessel is diluted more than for average production days; while the slurry will be concentrated for below average production days. The slurry percentage can be periodically adjusted during the production period in accordance with changes in the specific gravity of the slurry.

An important factor in the successful operation of the system is the size of the slurry vessel 27, which is dependent upon the amount of concrete usually produced by the operation for which the vessel is specifically designed. The major objective of the system is to maximize the probability that all of the slurry remaining in vessel 27 at the end of a day's production will be completely recycled within the next day's production period, which is normally no greater than twenty-four hours later, while using a vessel of minimum size. It has been found that this objective can be achieved by selecting a vessel capable of containing a minimum average working level of the liquid therein which is equal to a predetermined fraction of the added batch water required for an average day's concrete production. The predetermined fraction is normally less than unity, with a range of from about one-fifth to one-half being preferred. Prior to installation of a vessel 27, this calculation is made by multiplying the average concrete production of a given ready-mix plant in cubic yards by the number of gallons of batch water added per cubic yard, and multiplying the result by the predetermined fraction. The average working level of the liquid in vessel 27 is made up of the cement-water mixture supplied to vessel 27 from aggregate classifier 21, fresh water supplied to vessel 27 from the normal plant water unit 15 via autochangeover unit 20, rinse water and fugitive water which drains into vessel 27, and flush water supplied to the mechanical bearings associated to the agitators in vessel 27 (described below). It should be noted that, for concrete fabrication yards in which the average day's production varies on a seasonal (or other) basis, the vessel sizing calculation is done with reference to the maximum average day's production: For those periods in which the average value is less, the working capacity of the vessel is reduced accordingly in the manner described below.

With a properly selected vessel, the density of the slurry in vessel 27 will typically vary over a wide range depending on the production activity of the yard. It should be noted that the maximum density of the slurry which can be tolerated while still ensuring slurry consumption within the next day's production period is substantially higher than that found in prior art systems. In general, the specific gravity of the slurry in vessel 27 after completion of washout will generally lie in the range from around 1.02 to about 1.18, depending upon the amount of returned concrete for a given production period. Further, it has been found that a vessel capable of meeting the above criteria requires a volume which is substantially smaller than that required by prior art systems.

DETAILED DESCRIPTION OF SYSTEM

FIG. 2 is a top plan or aerial view of a portion of a ready-mix yard incorporating the invention. As seen in this figure, the system includes an apron portion 35 preferably of cast concrete for providing proper support surfaces for various components, and also for providing proper drainage of fugitive water into the slurry vessel 27. For this purpose, drain channels such as the channels 36–38 are provided leading toward the interior of vessel 27; in addition, apron 35 is formed to a proper slope so that fugitive water tends to drain toward channels 36, 37.

A truck washout portion 11' of ready-mix truck station 11 includes a raised curb 39 which provides a convenient reference stopping point for ready-mix trucks to back up to an inlet hopper 40 for dumping returned concrete. A truck water washout pipe 41 is provided for the purpose of supplying washout water upon demand to an individual truck. If desired, a plurality of such pipes may be provided, depending upon the average number of trucks which will normally be expected to be washed out at the same time.

Returned washout concrete from each truck enters the aggregate classifier unit 21 at the end thereof directly below hopper 40.

FIG. 3 is a perspective view illustrating certain elements of the invention. To avoid unnecessary detail, elements 12–17, and 22–25 have been omitted from this view. Density cell 31 is schematically depicted in this view in the shape of a shielded pipe section 31a suspended from a load cell 31b. Preferably, pipe 31a is a 10" diameter pipe having an electrically controllable closure valve at the bottom, the pipe defining a volume sufficient to hold 100 lbs. of water, while load cell 31b comprises a conventional LVDT which is electrically coupled to a calibrated volt meter (not shown), preferably a Weigh Tech Model DVM-650A Digital Volt Meter. Typically, the volt meter is located at the plant operator station 16 on the ENVIROMATIC console 18.

The optional hydrocyclone 29 is shown suspended above a hopper 42 positioned to receive sand fines removed from the slurry-sand fine mixture, the hopper 42 being removable at appropriate intervals for emptying. The sand fines may be either distributed as fill material, reprocessed at a suitable reprocessing site, or used for any other appropriate use.

With reference to FIGS. 3–5, aggregate classifier 21 includes a classifier screw 45 driven by a motor 46 and a gear reduction mechanism generally designated by reference numeral 47, the output of which is coupled to the upper end of classifier screw 45. The lower end of classifier screw 45 is rotatably carried by a tail bearing assembly 48, illustrated in detail in FIG. 11, which is pivotally connected to the perimeter of hopper 40 adjacent curb 39 by means of a suitable link 50. The opposite edge of hopper 40 is coupled by means of a support arm 51 to a stationary support member 52 by means of a sliding and pivoting coupling illustrated as a slot 53 and a pin 54 (FIG. 5). The driven end of classifier screw 45 is also pivotally connected to a stationary reference point by means of a pivot rod 55. This mounting arrangement enables the tail end of the classifier screw 45 to be raised and lowered at the hopper end by a simple hoist or forklift truck when maintenance is required.

Located adjacent the driven end of classifier screw 45 is a surge hopper 60 of conventional construction, and the receiving end of the returned aggregate conveyor 62. The other end of conveyor 62 (see FIG. 2) terminates at a vibrating screen 22 station below which are placed coarse, medium and fine reclaimed aggregate temporary storage bins.

The classifier screw 45 is pivotally received within a generally U-shaped housing 57 terminating in an inlet bin portion 58 adjacent the tail bearing end of classifier screw 45. A U-shaped channel 43 (FIG. 14) which encloses the inlet bin portion 58 of housing 57 provides a weired flow path for returned slurry to the inlet side of vessel 27. Channel 43 is preferably secured to bin portion 58 in such a manner as to be adjustable vertically, as suggested by the arrows, in order to optimize slurry overflow into the channel from the bin portion. Since the returned slurry flows into vessel 27 by gravity alone, no pump is required and this arrangement comprises one energy saving feature of the system.

The slurry vessel 27 is mounted transversely and generally centrally below the aggregate classifier unit 21 and is provided with a pair of rotatable agitators 65, 65' at the bottom thereof. In the preferred embodiment, the vessel 27 is mounted below ground on suitable support means, such as I-beams 66. To provide additional support for vessel 27, peripheral flanges 67 are embedded in a rectangular concrete reinforcement beam 68. The vessel 27 is provided with a longitudinally extending partition 69 which provides a hydrodynamic imbalance to the slurry in the vessel and aids in the clarification of the water constituent of the slurry.

As best seen in FIG. 5, the returned slurry drains into the left hand portion of vessel 27, which is divided by partition 69. When agitators 65, 65' are not operating (which is true most of the time), the greater quantity of slurry on the inlet side causes a hydrostatic pressure which forces the water constituent of the slurry underneath the bottom edge of partition 69 and over to the right hand side of the vessel 27. As a result, the liquid present in the right hand portion of the vessel 27 is increasingly dilute with height above the floor of the vessel 27, with the uppermost portion comprising clarified water. It should be noted that initially, beginning with an empty tank, the vessel 27 functions as a partitioned settling pond. Thus, when slurry drains into vessel 27 the sand fines and cement fines settle to the bottom and the more dilute portions of the slurry pass under the partition to the right hand side. As more slurry drains into vessel 27, the settled fines form a filter mat 70 and the more dilute portions pass through the increasingly thick filter mat 70, under partition 69 and accumulate on the right hand side of partition 69. Since the liquid accumulating on the right hand side of vessel 27 is less dense than the slurry on the left hand side, the top surface of the former rises to a level 71 (shown in phantom) above the level 72 of the latter. As clarified water is subsequently drawn off from the top of the right hand column of liquid, the level 71 drops to the height 71' depicted in full in FIG. 5.

In use, when a returned ready-mix truck is washed out, the returned concrete mix flows through conical hopper 40 to the tail portion of classifier screw 45 and the surrounding bin region. As the returned concrete mix enters the tail portion, motor 46 is actuated in response to washout water demand by the truck operator depressing wash-out button 44a or 44b, thereby causing classifier screw 45 to rotate and auger the mix toward the surge hopper 60. Within the classifier screw assembly, the aggregates and coarse sand are separated from the cement, water and sand fines: The former are augered up to surge hopper 60 and conveyed away by conveyor 62 to vibrating screen 22 for storage and later use; the latter weir over into channel 43 and flow under the influence of gravity along channel 43 into the slurry vessel 27. Classifier screw 45 is permitted to run for a predetermined period of time after the beginning of truck washout, e.g., thirty minutes, and is then de-energized until the next water washout request from a truck operator. As noted above, the reclaimed and sorted aggregate and coarse sand are periodically returned to the plant aggregate storage unit 14, while the slurry in vessel 27 is further processed.

It should be noted that initial separation of the returned concrete mix constituents occurs in conical hopper 40 by virtue of the centrifugal forces experienced by the mix in flowing in a spiral path from the perimeter of the hopper 40 toward the center. It is for this reason that the conical design is preferred, although other geometries may be employed, if desired.

It is also noted that overloading of the capacity of the system to accept returned mix can be controlled by selection of metering bars forming an inlet grid 202 having predetermined dimensions. Also, the grid openings in grid 202 control the maximum size of aggregate which can be accepted by the system and thus prevent entry of large concrete agglomerates or large rocks into the aggregate classifier unit 21.

In order to reduce power consumption, a pair of sensor probes 63, 64 are mounted in hopper 60 (FIG. 5), which sense the level of the returned aggregates and at least some sand fines accumulating in hopper 60 when screw 45 is operating. When the level reaches the activating level for upper probe 63, the hopper 60 and the conveyor 62 are automatically activated in response to a signal generated by probe 63. Both units 60 and 62 remain operative until a predetermined time out period after the level of the constituents in hopper 60 falls below the activating level for lower probe 63. Probes 63, 64 preferably comprise probes of the type described below with reference to FIGS. 6 and 7.

The slurry in vessel 27 is processed to produce clarified water, to remove the sand fines therefrom periodically, and to maintain the slurry in a usable state for reclamation. A better understanding of this processing may be had with reference to FIGS. 6 and 7 which illustrate certain details of the system components housed within and adjacent the slurry vessel 27. As noted supra, a pair of agitators 65, 65' substantially identical in configuration, are mounted adjacent the bottom of slurry vessel 27. Each agitator is driven by a common gear train unit 75 secured to the bottom of vessel 27 by a suitable fastening mechanism such as bolts 76, and having a pair of output shafts 77, 77' coupled to the driven end of an associated one of the agitators 65, 65' by means of a spherical U-joint generally designated by reference numerals 78, 78', the former being fully illustrated in FIG. 6. With reference to FIG. 6, spherical U-joint assembly 78 includes a driving yoke 79 directly coupled to output shaft 77 for rotation therewith, a ball joint 80 to which yoke 79 is pinned, and a driven yoke 81 also pinned to ball joint 80 and coupled to the driven end of agitator 65. A cover seal 82, fabricated from neoprene or the like, is provided to protect the U-joint assembly 78 surfaces from contamination and to define an enclosed volume for a suitable lubricant for U-joint assembly 78.

The remaining end of each agitator 65, 65' is coupled to a tail bearing assembly generally designated by reference numerals 83, 83' and shown in detail in FIG. 11. The casting of each tail bearing 83, 83' is supported on a different ledge 85, 85' secured to the right inner wall of slurry vessel 27 as viewed in FIGS. 6 and 7. In addition, the tail bearing end of each agitator 65, 65' is normally secured against longitudinal displacement by means of a vertically extending separate link, such as link 87' (FIG. 7) which is pivotally connected to a lug 88' on the tail bearing assembly casing at the lower end and is pivotally secured to a fixed reference point at the upper end thereof. Each tail bearing is oil cooled and lubricated, and also water flushed, from above the slurry vessel, and to this end flexible conduits are included to provide both an inlet and an outlet for the bearing flush water and an inlet conduit for the lubricant. This arrangement is illustrated for the tail bearing 83' by water inlet and outlet lines 90', 91' and lubricant inlet conduit 92' (FIG. 7).

Common gear train unit 75 is powered by a motor 95 mounted at ground level (or above) and a connecting rod 96 extending from the output shaft (not shown) of the motor 95 to the input shaft 98 of gear train unit 75. With reference to FIGS. 8–10, input shaft 98 is mounted by means of suitable bearings 99 for rotation about a vertical axis with drive shaft 96 and terminates in a pinion gear 101, preferably a spiral bevelled or worm pinion gear, which mates with an intermediate ring gear 102 (FIG. 10) mounted by means of suitable bearings 103 for rotation about an axis transverse to the axis of rotation of shaft 98. A helical pinion gear 104 is coupled to shaft 105 for rotation with ring gear 102. Helical pinion gear 104 is coupled to a pair of helical driven gears 107, 108 which are essentially identical in configuration and which are mounted on shafts 109, 110 for rotation about a pair of laterally spaced flanking axes substantially parallel to the axis of rotation of shaft 105.

The entire drive train unit is enclosed in a twopiece housing comprising upper half portion 112 and lower half portion 113 having mating flanged portions 114, 115. In order to provide lubrication to the several bearings in the unit, casing portions 112 and 113 are sealed and a lubrication inlet pipe 117 which communicates with the interior of the housing is provided. Lubrication inlet 117 is coupled to any suitable source of a convenient lubricant (not shown) preferably mounted above the level of the slurry vessel 27.

In operation, when motor 95 is actuated each agitator 65, 65' is rotated by the associated output shaft 77, 77' from gear train unit 75 at a predetermined rate for a predetermined length of time. In the embodiment shown in FIGS. 6 and 7, the gear ratios are such that a rotational speed of 1780 rpm applied to gear train input shaft 98 provides an output speed of 50 rpm which is directly coupled to each of the agitators 65, 65'. As will be apparent, different gear ratios and different agitator speeds may be selected in accordance with the requirements of any given application. As will be apparent, as each agitator 65, 65' is rotated the paddle portions agitate any slurry present in the vessel 27 in order to maintain the cement in suspension and thus preserve the slurry for use by the ready-mix plant 12. It should be noted that the duration of operation of each agitator 65, 65' is extremely small, and that each agitation period is repeated at infrequent intervals. For example, in the preferred embodiment each agitator 65, 65' is operated for a period of approximately thirty seconds once every hour at the relatively slow speed of 50 rpm (25 revolutions per agitation cycle). As a result, the amount of power required to maintain the slurry in the usable state is substantially lower than that found to be required by prior art systems, which is another energy saving feature of the invention.

As best seen in FIGS. 4 and 5, the cross-sectional shape of each agitator 65, 65' shaft is square. This configuration has been found to substantially reduce or completely eliminate slurry build-up on the surface of the agitator shafts, which reduces power consumption when each agitator is actuated. The reduced slurry build-up is due to the velocity gradient along the surface of the agitator shaft provided by the square cross-sectional shape.

As noted above, periodically the slurry in vessel 27 is drawn off and pumped to the ready-mix plant unit 12 for admixture to the fresh concrete mix ingredients, to density cell 31 for measurement of the specific gravity and to centrifugal separator 29 for removal of sand fines. This is accomplished by means of a single pump 121 having an inlet 122 and an outlet 123, the pump 121 being driven by a suitable motor 124. Coupled to the inlet 122 of pump 121 is a slurry withdrawal pipe 126 which extends along the length of the slurry vessel 27 on the inlet side of partition 69 and down to the bottom region. An electrically operated pneumatically powered solenoid valve 128, controlled by the operator at the plant operator station 16, controls the flow path between the slurry in vessel 27 and the pump 121. Other conventional valves and pipes are installed in a conventional manner for routing the slurry to and from its various destinations, as depicted in FIG. 3 and tabulated in FIG. 13.

Also coupled to the inlet 122 of pump 121 by means of an electrically operated pneumatically powered solenoid valve 129 is a clarified water withdrawal pipe 130.

A key feature in the proper functioning of the system is a pair of level sensors designated by reference numerals 140, 141 which are suspended in the interior of slurry vessel 27 as indicated in FIG. 7 at slightly spaced vertical positions and which generate liquid level signals. More specifically, liquid level indicator 140 is used to generate a control signal which causes the autochangeover unit to switch to a flow path configuration in which water is supplied from normal plant water unit 15 to the washout portion 11' of the truck station 11 and the aggregate classifier unit 21 whenever the top surface of the liquid in vessel 27 falls below the vertical position of level sensor 140. Similarly, for a rising liquid level, level sensor 141 provides a control signal for switching the supply of water from normal plant water unit 15 to the clarified water from slurry vessel 27. Each level sensor 140, 141 is preferably a conductivity probe which conducts low levels of either D.C. or A.C. current at low resistance levels when the probe is not submerged in the liquid and high levels of D.C. or A.C. current at high resistance levels when the probe is submerged. Thus, each probe provides an electrical control signal of different predetermined magnitude in each one of two states, depending on whether the sensing element contained therein is in contact with the liquid in vessel 27. These electrical signals are amplified by appropriate known amplifier circuits, and are either coupled directly to the autochangeover unit 20 and the appropriate electrically operated solenoid valves (such as valves 128, 129) or routed to the associated valves by means of the plant operator station 16. The vertical spacing between level sensors 140 and 141 is selected on the basis of the average amount of water used to wash out a returned truck to avoid frequent switching of the water supply between the vessel 27 and the plant water supply 15. The actual value of the separation distance varies with the size of a particular vessel 27. If desired, other types of level sensors may be employed, such as a pneumatic air bubble sensor, a float switch sensor, an optical sensor or an ultrasonic sensor.

FIG. 11 illustrates a first embodiment of a bearing assembly used for agitator tail bearing assemblies 83, 83' and classifier screw tail bearing assembly 48. As seen in this figure, which illustrates tail bearing assembly 83, the unit includes a generally cylindrical casing portion 145, a rear bearing retainer 146 secured to the rear end of casing 145 by any suitable means, such as cap screws 147, and a seal mounting ring 148 secured to the forward end of casing 145 by cap screws 149. Secured to the rear end of a multi-diametered shaft 151 is a first bearing assembly, preferably comprising a spherical roller bearing 152 and a tapered adapter sleeve 153. Also secured between shaft 151 and the internal diameter of the casing 145 at a more forward location is a roller bearing assembly 155. The generally annular volume defined by the inner surface of casing 145 and the outer surface of that portion of central shaft 151 enclosed by bearings 152 and 155 provides a lubricant cavity for holding a suitable lubricant for the bearings. In order to provide access to lubricant cavity 156, casing 145 is provided with an aperture shown in hidden lines generally designated by reference numeral 157 to which the lubrication inlet conduit 92 is sealingly connected.

In order to avoid contamination of bearings 155 and 152 by the slurry in vessel 27, a plurality of hydrodynamic radial wave seals 160-162 are mounted about the periphery of the forward portion of shaft 151, with two seals 160, 161 adjacent the bearing assembly 155. Seals 160-162 are of known design and act to prevent migration of slurry toward bearing 155 (to the right as viewed in FIG. 11). Bearing flush water is circulated through the generally annular volume enclosed by seals 161, 162 via inlet 90 and outlet 91, with only fresh water from supply 15 being used for this purpose. In the process of flushing the tail bearing inner volume forward of ball bearing assembly 155 the exiting flush water from conduit 91 is dumped into the slurry vessel. It should be noted that the condition of seal 162 can be inspected from the surface by mere visual inspection of the bearing flush water returned to ground level via outlet conduit 91. Similar water seals are provided for output shafts 77, 77' of gear train unit 75.

As noted above, periodic operation of agitators 65, 65' at extended intervals for short periods of time ensures that any slurry in vessel 27 remains in the active state sufficiently long to prevent hardening of the slurry. However, if an extended power failure occurs during a relatively long period when the system is unattended (e.g., three or more days), the slurry in the bottom of the vessel 27 can acquire a viscosity sufficiently large to prevent rotation of the agitators 65, 65' upon the application of power thereto. In such a case, it is merely necessary to raise one or both agitators 65, 65' by the associated connecting link 87, 87' using a hoist or a forklift to an intermediate position, such as the phantom position shown in FIG. 7, release the tail bearing end of each agitator while applying power, and the more viscous slurry portion will be gradually mixed with the less viscous upper portion of the slurry under the combined forces of the weight of the agitators and the rotation thereof. In order to prevent lateral sway of the tail end during such a process, each agitator 65, 65' is provided with a pair of vertically arranged laterally spaced guides 145, 145' which are sufficiently rigid to retain the agitator tail end against lateral motion.

It should be noted that the agitator drive assembly of FIGS. 6 and 7, while employing a single motor 95 to drive both agitators 65, 65', can be operated in such a manner that the substantially full power of motor 95 is applied to one of the two agitators. For example, should it be required to apply full power to agitator 65, it is only necessary to raise agitator 65' to the position shown in phantom in FIG. 7 at which agitator 65' presents a negligible load through drive unit 75 to motor 95 (since the agitator 65' is positioned on the more dilute side of the partition 69, and is only partially submerged when raised). Similarly, by raising agitator 65, substantially full power can be applied to agitator 65'. This arrangement allows the use of a relatively low power single motor (e.g., 20 H.P.) for twin agitators without sacrificing performance, and is another energy saving feature of the invention.

FIGS. 3 and 12 illustrate an alternate embodiment of the agitator drive train and the agitator and classifer screw bearing assemblies. As seen in these Figs., a pair of motors 95' are mounted to the top of the slurry vessel 27. A chain drive 150 is coupled to the motor output shaft (after appropriate gear reduction, if necessary) and to a sprocket 172 mounted near the bottom of vessel 27. Sprocket 172 is coupled by means of a shaft 173 to the U-joint assembly 78. Shaft 173 is mounted in the casing 175 by means of spaced Timken bearing assemblies 176, 177, and casing 175 is coupled by means of a mounting plate 178 to an internal partition 180 secured in the bottom of slurry vessel 27. The FIG. 12 bearing assembly is water flushed in a manner similar to that described above with reference to FIG. 11, by means of inlet and outlet bearing flush conduits 181, 182. In addition, a lubrication conduit 183 is also provided. The bearing assembly is also provided with seals 160-162 similar to those described above.

FIG. 12 also illustrates cover seal 82 in greater detail. As seen in this figure, seal 82 is secured to the periphery of the U-joint assembly 78 by means of friction bands 186, 187. A lubrication aperture 188 is provided with a closure plug 189; similarly, a vent aperture 190 is provided with a closure plug 191.

It should be noted that the double Timken bearing assembly of FIG. 12 may also be employed for the agitator tail bearing assemblies 83, 83' and the screw classifier tail bearing assembly 48, if desired.

As noted above, the system is compatible with both metered and weighed ready-mix plant installations. FIG. 3 illustrates the terminal configuration for a metered installation. As seen in this figure, a slurry line 201 from pump 121 is coupled via a flowmeter 203 to outlet conduit 204 coupled to the batch deck of the ready-mix plant 12. Flowmeter 203 may comprise any one of a number of known devices capable of generating a measuring signal in response to the flow of liquid therethrough. Preferably, flowmeter 203 comprises a vortex shedding meter, such as an Eastech Model 2210 or 2310 flowmeter, provided with means for generating electrical pulse signals at a frequency related to the volumetric flow rate. A vortex shedding meter is preferred, since this type of device has no internal moving elements which might be disturbed by small pieces of aggregate remaining in the slurry; in addition, this type of flowmeter provides a quick response, is accurate at low flow velocities, and is highly accurate through a wide linear range.

FIG. 3A illustrates the terminal configuration for a weighed installation. As seen in this figure, the slurry line 201 is coupled directly to outlet conduit 204 in this configuration.

FIG. 13 is a table illustrating the setting of the various valves indicated in FIG. 3 for the different modes of operation specified, each opened valve being signified by an X, and also the state of motors 95' (the agitator motor), 46 (screw 45 motor) and 124 (pump 121 motor). For example, to fill the density cell 31 in order to take a specific gravity measurement of the slurry, valves E, J and L are opened, both agitators 65, 65' are operated and the pump 121 is also operated. Similarly, for truck washout via pipe 41 (signified as washout truck station No. 2) with normal plant water 15, valves B, D, H, and K are opened and classifier screw 45 is operated. For washout using clarified water from the slurry vessel 27, valves B, H, I and K are opened, and both classifier screw 45 and pump 121 are operated.

As shown in the table of FIG. 13, the backflush operation is performed in two stages. During stage 1, valves G and P are opened, after which valves J, I and H are sequentially opened and closed; during stage 2, valve D is opened, followed by sequential opening and closing of valves E, F and R.

FIG. 13 also illustrates the operation of autochangeover unit 20. Taking the operation WASHOUT TRUCK STATION #1 as an example, during NORMAL mode, water is supplied to the washout station from the normal plant water supply via valve D whenever the level of the clarified water in vessel 27 lies below probe 140 (FIG. 7). Whenever the level of the clarified water lies above probe 141, the CLARIFIED mode is followed in which clarified water is supplied to the washout station via valve I with pump motor 124 activated.

The remaining operations can be determined by inspection of the table.

As noted above, in selecting the percentage of slurry to be added to any freshly batched mixture of concrete, the operator first obtains the specific gravity of the slurry in the vessel 27 (normally at the beginning of yard operation). Next, the operator determines the amount of scheduled production for the yard for that particular day. The purpose for ascertaining this figure is to enable the operator to completely consume the slurry in vessel 27 within the day's production period. Once these two figures are known, the operator may select the percentage of slurry to be admixed to the fresh concrete by referring to one of the utilization charts shown in FIGS. 15A–15H. The particular chart to be consulted is determined by the working level of the slurry vessel 27, which is preselected for a given yard. For example, assuming that the vessel 27 has a 4,000 gallon working level, the specific gravity of the slurry is 1.07 and the scheduled production for that day is 250 cubic yards of batched concrete mix, the operator refers to FIG. 15C and selects 45%. Similarly, for a vessel 27 with a 7,000 gallon working level, a specific gravity of 1.04 and a scheduled production quantity of 400 cubic yards, the operator refers to FIG. 15F and selects a slurry percentage of slightly over 30%. It should be noted that the utilization charts 15A–15H have been prepared with reference to concrete which is batched using five sacks of cement per truck and 25 gallons of water per cubic yard. Other charts may be calculated for different concrete batching ratios.

FIGS. 16A–C illustrate alternate embodiments of the slurry reclamation process in which the percent activity of the cement fine constituents in the slurry is included in the determination of the relative amounts of fresh cement fines, sand, and water to be admixed when preparing a concrete batch using reclaimed slurry. By "percent slurry activity" is meant the average percentage of cement fines present in the slurry which are still sufficiently active to function as a substitute for fresh cement fines. This figure of merit can be obtained for any slurry through conventional laboratory procedures known to those skilled in the art. The process according to FIGS. 16A–C typically begins by setting a programmed amount of cement, sand and aggregate by weight into a set point controller physically incorporated in the batching console 17 (FIG. 1). In addition, the amount of water by volume or weight is also set into a controller. These figures are determined by the operator in accordance with the concrete design mix figures normally used by the operator. The set point amounts of the main ingredients are then modified or compensated for in accordance with the percentage of slurry activity, the percentage of slurry substitution obtained from the utilization tables for the system (FIGS. 15A–H), and the specific gravity of the slurry measured by the density cell 31. The set amount of the aggregate by weight is unaffected by the slurry values, since the slurry ordinarily contains no aggregates. The batch controls for cement, water, sand and aggregate are then used to meter the relative amounts of the constituent ingredients to the ready-mix plant 12.

The compensation values may be determined in any one of a number of ways, for example, by manual calculation, or automatically using either analog or digital compensation signal generators. More specifically, in an analog system the three slurry parameters are represented by electrical signals whose voltage or current is proportional to the three values, and these three signals are used to control variable resistance potentiometers which drive the batch consoles. Similarly, in a digital system the compensation values may be automatically calculated using known digital techniques (e.g., a microprocessor based system) and used to generate digital signals for varying the set point control signals.

The general technique used to implement the process of FIGS. 16A–C proceeds as follows. The amounts of the individual constituents for a given mix design are first computed, with the sand weight and water volume amounts being adjusted for the average moisture content of the sand. These amounts are then adjusted by compensating for the amount of active cement fines and inactive fines present in the slurry to be substituted for the water. These figures are obtained from the percent slurry activity, the specific gravity of the slurry and the percent slurry substitution. The following are two specific examples of the manner in which the process is carried out. Both examples are for a design mix of 5 sack cement per cubic yard, ¾ inch rock aggregate, 6% sand moisture content and 36 gallons of water per cubic yard. Example 1 illustrates the process of FIG. 16A in which the cement weight alone is adjusted, while Example 2 illustrates the process of FIG. 16B in which the sand weight alone is adjusted.

EXAMPLE 1

The constituent weights per cubic yard of concrete mix in accordance with this design are as follows:
Cement = 5 sacks × 95 lbs/sack = 470 lbs
Dry Sand = 1650 lbs
Rock = 1650 lbs
Total Water (including sand moisture) = 36 gallons
For a 4 cubic yard batch:
Cement = 4 × 470 lbs = 1880 lbs
Sand = 4 × [1650 lbs ÷ (1.0 − % sand moisture)] = 7021 lbs
Rock = 4 × 1650 lbs = 6600 lbs
Water = 4 × [36 gals − total sand moisture] = 93.58 gals For 100% activity slurry with specific gravity of 1.068 substituted 100% for water:

$$
\begin{aligned}
\text{Slurry} &= 93.58 \text{ gals} + [\text{total addded water} \times \\
& \quad \% \text{ solids in slurry by volume}] \\
&= 93.58 \text{ gals} + [93.58 \text{ gals} \times 0.0312] \\
&= 96.5 \text{ gals} \\
\text{Cement} &= 1880 \text{ lbs} - [\text{slurry by volume} \times \text{weight of} \\
& \quad \text{water per gallon} \times \text{specific gravity of} \\
& \quad \text{slurry} \times \% \text{ solids in slurry by weight}] \\
&= 1880 \text{ lbs} - [96.5 \text{ gals} \times 8.33 \text{ lbs per gal} \\
& \quad \times 1.068 \times 0.0935] \\
&= 1800 \text{ lbs} \\
\text{Sand} &= 7021 \text{ lbs} \\
\text{Rock} &= 6600 \text{ lbs.}
\end{aligned}
$$

The specific gravity of the slurry in the above example is assumed to be 1.068, as measured by the density cell 31, the slurry is assumed to have 100% active cement fines, and the assumed substitution is 100% slurry for the programmed amount of water in the design mix. As can be seen from this example, the volume of the slurry to be substituted for the programmed amount of 93.58 gallons of water must be increased by the percent solids contained in the slurry by volume. On the other hand, the quantity of cement fines must be reduced by the percentage of active solids in the slurry by weight. Both percentage figures for the slurry may be calculated in a known manner. The following table illustrates the savings in cement for a 4 cubic yard batch using the mix design noted above and substituting all slurry for the normal water ingredient.

TABLE I

| INGREDIENT | MIX DESIGN | 100% SLURRY SUBSTITUTION |
|---|---|---|
| Cement | 1880 lbs. | 1800 lbs. |
| Sand | 7021 lbs. | 7021 lbs. |
| Rock | 6600 lbs. | 6600 lbs. |
| Water | 93.58 gals. | 96.5 gals. slurry |

EXAMPLE 2

In this example illustrated in FIG. 16B, the same design mix is assumed, the specific gravity of the slurry is the same (1.068), the slurry is assumed to be 100% inactive (no active cement fines), and the slurry is assumed to substitute 100% for the normal water constituent.

$$
\begin{aligned}
\text{Slurry} &= 93.58 \text{ gals} + [\text{total added water by volume} \\
& \quad \times \% \text{ solids of slurry by volume}] \\
&= 93.58 \text{ gals} + [93.58 \text{ gals} \times 0.0312]
\end{aligned}
$$

-continued

```
            = 96.5 gals
Cement     = 1880 lbs
Sand       = 4 × [1650 lbs − (net added water ×
               weight of water per cubic yard × slurry
               specific gravity × % solids of slurry
               by weight)] ÷ (1 − % sand moisture)
           = 4 × [1650 lbs − (96.5 gals × 8.33 lbs
               per gal × 1.068 × 0.0935)] ÷ 0.94
           = 6680 lbs
Rock       = 6600 lbs.
```

The specific gravity of the slurry in the above example is also assumed to be 1.068, the slurry is assumed to have 0% active cement fines (all fines function as inert particles, e.g., sand), and the assumed substitution is 100% slurry for the programmed amount of water in the design mix. As can be seen from this example, the volume of the slurry to be substituted for the programmed amount of 93.58 gallons of water must be increased by the percent solids contained in the slurry by volume. On the other hand, the quantity of sand must be reduced by the percentage of passive solids in the slurry by weight. The following table illustrates the savings in sand for a 4 cubic yard batch using the mix design noted above and substituting all slurry for the normal water ingredient.

TABLE II

| INGREDIENT | MIX DESIGN | 100% SLURRY SUBSTITUTION |
| --- | --- | --- |
| Cement | 1880 lbs. | 1880 lbs. |
| Sand | 7021 lbs. | 6680 lbs. |
| Rock | 6600 lbs. | 6600 lbs. |
| Water | 93.58 gals. | 96.5 gals. slurry |

While the above two examples illustrate the limiting cases for 100% slurry activity, 0% slurry activity and complete substitution of slurry for water, intermediate examples follow by extrapolation. For example, if the percentage of slurry to be substituted for the water constituent is selected to be less than 100%, the calculation of the volume of slurry to be added must be reduced accordingly, and the remaining quantity of water to be added must be calculated. Similarly, for slurry having an activity lying between 100% and 0%, the weight of the slurry solids to be subtracted from the programmed amount of fresh cement fines is multiplied by this percentage figure; while the amount of slurry solids to be subtracted from the programmed amount of sand fines is multiplied by the complement of the percentage activity figure. This general process is illustrated in FIG. 16C.

While the water constituent and slurry substitution has been calculated on the basis of volume (gallons), the computations can also be made on the basis of weight, if desired.

While the three variations of the process illustrated in FIGS. 16A-C provide for monotonic variation of the percent slurry activity from 0 to 100%, the process control system may be modified, if desired, to provide binary selection between 0% (no active fines) and 100% (all fines active). In such a system the variable percent activity control may be replaced by a simple two state device, such as a switch.

As noted above, the system has a special mode of operation termed "slurry tank makeup", the valve and motor settings for which are illustrated in the table of FIG. 13. In this mode of operation, slurry vessel 27, which is initially empty of slurry, is filled to the level of sensor 141 from the normal plant water supply 15. The water in vessel 27 is then used for batching fresh concrete mix (as opposed to supplying the water to ready-mix plant 12 directly from plant water unit 15). This mode of operation is employed when the normal municipal water supply has a maximum flow rate which is less than that required for concrete batching, which is typically done on an interrupted high demand basis during the production day. By using the vessel 27 as a buffer storage tank for fresh water, the water demand during batching does not exceed the capacity of the water supply and batching can proceed on a regular basis. This mode is enhanced by the provision of pump 121 which is a high flow pump, with flow rates of one hundred to six hundred gallons per minute being typical.

With reference to FIGS. 3 and 17, in the course of operation of the optional centrifugal separator 29, the sand component of the slurry passed through unit 29 is normally ejected via lower outlet pipe 29a, termed the apex, while the cement fine and water components of the slurry are recycled back into the vessel 27 via the upper outlet pipe 29b, termed the vortex. The slurry is withdrawn from vessel 27 via suction pipe 126 (FIG. 7), and returned to the clarified water side of vessel 27 by a return pipe 204 (FIG. 3). Ideally, all the moisture (water) present in the slurry should be recycled back to vessel 27 via outlet pipe 29b, while completely dry sand should be ejected via outlet pipe 29a. In practice, some moisture will always be present in the ejected sand. In addition, only sand of predetermined minimum particle size and larger should be ejected, while the finer sand and cement fines should be returned to the vessel 27.

In order to minimize the amount of moisture carried away in the ejected sand and to enable variation of the minimum particle size of the ejected sand, the adjustable orifice of FIG. 17 can be employed. As seen in this figure, outlet pipe 29a is fabricated either entirely (as illustrated) or partially from a deformable, preferably elastic, material (e.g., rubber) and a mechanical adjustment device depicted as a conventional hose clamp 201 is arranged about the outer diameter of the deformable portion of pipe 29a. As the diameter of pipe 29a is reduced by tightening clamp 201, the amount of ejected moisture is reduced and the minimum ejected particle size is increased. Conversely, as the diameter is increased, the amount of ejected moisture is increased and the minimum ejected particle size is reduced. In practice, the optimal setting for the pipe diameter may best be determined on an empirical basis.

For proper operation of the system, the following points should be observed. The agitators 65, 65' are never operated during truck washout when clarified water is being supplied to the washout station 11'. The purpose for this operational constraint is to ensure that the clarified water region in vessel 27 is not disturbed by agitator operation, so that the liquid supplied to the truck washout station 11' is in fact clarified water. The aggregate classifier screw 45 should always be operated during truck washout and for a predetermined period of time thereafter in order to ensure that the returned concrete mix is separated into its several constituents, and that the constituents reach their various destinations (e.g. the aggregate storage units 23-25, and the slurry vessel 27). In addition, whenever possible, the slurry in vessel 27 should be scheduled for reclaiming at the beginning of the yard production day, so that all the slurry will be reclaimed and reused as quickly as possible.

An important feature of the invention is the capability of changing the working level of vessel 27 by repositioning sensors 140, 141 within vessel 27. Typically, vessel 27 is sized for the maximum average production of the yard, so that any change in the working level of the vessel 27 will be a reduction rather than an increase in the working level. This feature enables the slurry reclamation process to be adjusted to seasonal production levels found in many ready mix plants without the necessity of removing a vessel and replacing same with a vessel of a different size. In addition, when selecting vessel capacity, and the layout of apron 35 (FIG. 2) provision should be made to insure that all rainwater will drain toward vessel 27 in order to prevent overflow runoff from vessel 27 into outside storm drains sewers, drainage ditches and the like. Stated differently, any vessel overflow should be restricted to appropriate drain channels, such as channels 36, 37 in such a manner that slurry liquid will never flow out of the yard.

As will now be apparent, the invention provides several distinct advantages from both a system and method standpoint over known prior art type devices. Firstly, systems fabricated according to the teachings of the invention enable 100% reclamation of all return concrete mix constituents so that all of the ingredients are recycled and none are wasted. In addition, by observing the vessel size selection criteria, 100% of the slurry portion of the returned concrete mix is recycled within a sufficiently short period of time that the cement fine constituents do not lose their activity. In addition, by adjusting the working level of the slurry vessel 27 in accordance with seasonal production requirements, the capacity of the system for total slurry reclamation is independent of seasonal production fluctuations. Moreover, the system can be "fine tuned" to compensate for variations in the average percent activity of the cement fine portion of the returned slurry so that the basic ready-mix plant design mix is invariant when slurry is reclaimed and used in the batching of additional concrete mix.

From the standpoint of power consumption, the systems fabricated in accordance with the teachings of the invention are very economical to operate, particularly in view of the relatively small duration of the agitator operation cycle required by the design, and further in view of the fact that only a single pump 121 is employed for the slurry pumping, clarified water withdrawal, and back flushing operations for the system. Further power economy is achieved by the tilting agitator design, which permits the use of minimum horsepower motors 95, 95' for driving the agitators 65, 65', particularly when the common drive train unit of FIGS. 8-10 is employed.

From the environmental standpoint, the system is highly desirable in that all returned concrete mix constituents are separated and stored in protected enclosures, and further in view of the fact that the slurry vessel 27 may be installed below ground and requires a relatively small amount of physical space. Moreover, by maximizing the use of clarified water from the slurry vessel 27 for the returned truck washout and aggregate classifier operations, the consumption of local (municipal) water is substantially reduced.

At the component level, the tiltable agitator coupling permits rapid recovery from a power down condition which avoids the necessity of mechanically or manually excavating thickened slurry from the vessel 27 in all but the most extreme cases (e.g., should the agitator motor power remain off for a period greater than the time required for the slurry in vessel 27 to completely harden). In addition, it has been found that the provision of the tiltable agitator connection provides an additional benefit to the system. More specifically, since the use of the tiltable agitator joint permits flexibility in the shipping configuration for the assembly including vessel 27 and those mechanical components incorporated within the vessel, it has been found that thinner gauge materials may be employed in the manufacture of vessel 27 without risking damage to the vessel structure in shipment.

Lastly, since the active components of the system are entirely compatible with automatic process control equipment, many system cycles may be automatically controlled, using both analog and digital control systems capable of being designed in accordance with the requirements of any particular application. For example, agitator lockout during truck washout (when clarified water is being supplied to the washout station 11') can be automatically controlled by using a timing device (such as a one-shot multivibrator) for disabling the application of power to the agitator motor(s) for a predetermined period of time after actuation by a truck operator of a washout button 44a, 44b. Similarly, the operation of classifier screw 45 can likewise be controlled by a timing device so that the screw continues to run until a predetermined period of time after the last actuation of a truck washout button. In addition, automatic timing cycles can be incorporated to enable the operator to specify a time period which must expire prior to initiation of system cycles, such as automatic backflush, which can only take place during non-production periods. The exact nature of the associated control circuitry will vary from application to application and is not critical. Appendix I illustrates one example of a control system employing relay logic. Other arrangements will occur to those skilled in the art.

While the above provides a full and complete disclosure of the preferred embodiments of the invention, various modifications, alternate constructions and equivalents may be employed without departing from the true spirit and scope of the invention. For example, while a dual agitator embodiment has been expressly described, in some applications a single agitator will suffice, while in still other applications additional agitators beyond the two expressly described may be employed, either in the same slurry vessel or in tandemly arranged slurry vessels. In addition, while electrically powered motors have been illustrated, other motor means, such as hydraulic or thermodynamic, may be employed either outside or within vessel 27. Therefore, the above description should not be construed as limiting the scope of the invention which is defined by the appended claims.

What is claimed is:

1. In a method of manufacturing concrete in which a slurry is formed by mixing returned concrete and water in a vessel and wherein said slurry is selectively added to fresh concrete mix, the improvement comprising the steps of:

(a) providing a slurry vessel having a volume sufficiently great to accomodate a predetermined fractional portion of the total average volume of water used to produce fresh concrete during a predetermined production period, said fractional portion being less than unity;

(b) depositing aggregate-less returned concrete in said vessel during a production period;

(c) determining the specific gravity of said slurry during the next succeeding production period; and (d) withdrawing said slurry from said vessel for admixture to fresh concrete mix at a rate selected in accordance with said specific gravity so that substantially all of the slurry is consumed within said next succeeding production period.

2. The method of claim 1 wherein said fractional portion is in the range from about one-fifth to about one-half.

3. The method of claim 1 wherein said slurry is consumed within approximately twenty-four hours.

4. The method of claim 1 further including the step of permitting said slurry to separate into clarified water and remaining constituents.

5. The method of claim 4 wherein said method is performed at an installation having a truck washout station and wherein said method further includes the step of supplying said clarified water to said washout station upon demand.

6. The method of claim 5 further including the steps of providing an independent source of water, sensing the level of liquid in said vessel, and supplying water to said truck washout station alternately from said vessel and said independent source in accordance with the level of said liquid in said vessel.

7. The method of claim 6 wherein said step of sensing includes the steps of sensing a higher level and sensing a lower level, and wherein said step of supplying includes the steps of coupling said clarified water to said washout station when said higher level is sensed, switching to said independent source when said lower level is sensed, and switching back to said clarified water when said higher level is again sensed.

8. The method of claim 1 further including the steps of providing an independent source of water, supplying water from said independent source to said vessel to at least partially fill said vessel, and using said water in said vessel as a buffered water source for said fresh concrete mix.

9. The method of claim 1 further including the step of cycling the liquid in said slurry vessel through a centrifugal separator at periodic intervals to remove sand fines therefrom.

10. The method of claim 1 wherein said method further includes the step of initially processing said returned concrete to remove aggregates therefrom prior to depositing the slurry in said vessel.

11. The method of claim 10 wherein said step of initially processing includes the step of restricting the inlet flow of returned concrete to a maximum value to prevent backflow thereof.

12. The method of claim 1 wherein said method further includes the step of periodically agitating the slurry in said vessel for a predetermined duration.

13. The method of claim 12 wherein the period of slurry agitation is approximately every one hour and wherein said duration is approximately thirty seconds.

14. The method of claim 1 further including the step of permitting fugitive water adjacent said vessel to flow into said vessel.

15. The method of claim 1 wherein said step (c) of determining includes the step of (i) establishing the amount of concrete production for said next succeeding production period, and wherein said step (d) of withdrawing includes the step of selecting said rate at least partially on the basis of said amount established in step (i) of establishing.

16. The method of claim 1 wherein said step (c) of determining includes the step of (ii) establishing the average percent activity of the cement constituent of said slurry; and further including the steps of determining the design amount of fresh cement to be admixed to the remaining ingredients for a design mix of said fresh concrete, and modifying said design amount in accordance with said average percent activity of said slurry and said rate of slurry withdrawal.

17. The method of claim 1 wherein said step (c) of determining includes the steps of (iii) establishing the average percent inactivity of the solids content of said slurry; and further including the steps of determining the design amount of inert fine particulate material to be admixed to the remaining ingredients for a design mix of said fresh concrete, and modifying said design amount in accordance with said average percent activity of said slurry and said rate of slurry withdrawal.

18. The method of claim 1 wherein said step (c) of determining includes the step of (iv) establishing the percentage solids content by volume of said slurry; and further including the steps of determining the design amount of water to be admixed to the remaining ingredients for a design mix of said fresh concrete, and modifying said design amount in accordance with said percentage solids content of said slurry and said rate of slurry withdrawal.

19. A system for reclaiming unused concrete for use in production of fresh concrete, said system comprising:
a slurry vessel for receiving returned concrete, said vessel having a volumetric capacity sufficiently great to accomodate a predetermined fractional portion of the total average volume of water used to produce fresh concrete during a predetermined production period, said fractional portion being less than unity;
means for depositing aggregate-less returned slurry in said vessel during a production period;
means for determining the specific gravity of said slurry during the next succeeding production period; and
means for withdrawing said slurry from said vessel for admixture to fresh concrete mix at a rate selected in accordance with said specific gravity so that substantially all of the slurry is consumed within the next succeeding production period.

20. The combination of claim 19 wherein said fractional portion is in the range from about one-fifth to about one-half.

21. The system of claim 19 wherein said slurry is consumed within approximately twenty-four hours.

22. The combination of claim 19 wherein said system further includes means for initially processing said returned concrete to remove aggregates therefrom prior to depositing the slurry in said vessel.

23. The combination of claim 22 wherein said initially processing means includes flow restrictor means for limiting the flow of returned concrete to a maximum value to prevent overloading of the system processing capability.

24. The combination of claim 22 further including means for supplying clarified water from said vessel to said processing means.

25. The combination of claim 19 further including a truck washout station and means for supplying clarified water from said vessel to said washout station upon operator demand.

26. The combination of claim 25 further including inlet conduit means adapted to be coupled to an independent source of water, means for sensing the level of the liquid in said vessel, and changeover means coupled to said sensing means for supplying water to said truck washout station alternately from said vessel and said inlet conduit means in accordance with the level of said liquid in said vessel.

27. The combination of claim 26 wherein said level sensing means comprises first and second probe means for sensing a higher and lower level of said liquid, respectively, and wherein said changeover means includes means for coupling clarified water from said vessel to said washout station when the level of said liquid in said vessel is at least equal to said higher level, means for changing the water supply to said inlet conduit means when the level of said liquid in said vessel falls to said lower level, and means for changing the water supply back to said vessel when the level of said liquid in said vessel again rises to said higher level.

28. The combination of claim 19 wherein said system further includes conduit means adapted to be coupled to an independent source of water, means for supplying water from said source via said conduit means to said vessel to at least partially fill said vessel, and means for supplying said water from said vessel for admixture to said fresh concrete mix so that said vessel operates as a buffered water source.

29. The combination of claim 19 further including centrifugal separator means, and means for cycling the liquid in said slurry vessel through said centrifugal separator means at periodic intervals to remove sand therefrom.

30. The combination of claim 29 wherein said centrifugal separator means includes variable diameter sand outlet means, and means for enabling dimensional adjustment of said variable diameter sand outlet means.

31. The combination of claim 19 wherein said system further includes means for enabling fugitive water adjacent said vessel to flow into said vessel.

32. The combination of claim 19 wherein said system further includes means for periodically agitating the slurry in said vessel for a predetermined duration.

33. The combination of claim 32 wherein the period of slurry agitation is approximately every one hour and wherein said duration is approximately thirty seconds.

34. The combination of claim 32 wherein said agitating means includes mechanical drive means having an output drive shaft, an agitator shaft positioned within said slurry vessel and having an axis, said agitator shaft having a driven end and a freely rotatable end, and tiltable bearing means coupled to said output drive shaft and said driven end for enabling transfer of mechanical power from said drive means to said agitator shaft, said tiltable bearing means enabling said freely rotatable end of said agitator shaft to be raised from and lowered to a normal operating position.

35. The combination of claim 34 wherein said tiltable bearing means comprises a spherical universal joint.

36. The combination of claim 34 further including a cover seal means for enclosing said tiltable bearing means.

37. The combination of claim 34 wherein said vessel is provided with support means on the end thereof adjacent said freely rotatable end of said agitator shaft, and further including tail bearing means coupled to said freely rotatable end of said agitator shaft, said tail bearing means being supported by said support means when said agitator shaft is in the operable position.

38. The combination of claim 37 wherein said support means further includes guide means extending generally vertically of said vessel for confining the path of said freely rotatable end of said agitator shaft during raising and lowering thereof.

39. The combination of claim 37 wherein said tail bearing means includes a casing having a longitudinal axis substantially coaxial with said agitator shaft axis, first and second axially spaced bearing devices for supporting said freely rotatable end of said agitator shaft, the internal volume between said bearing devices defining a lubrication cavity, fluid seal means positioned adjacent one of said bearing devices externally of said lubrication cavity for preventing said slurry from contaminating said bearing devices, and means for introducing lubricant to said lubrication cavity.

40. The combination of claim 39 wherein said introducing means includes an inlet extending through said casing into said lubrication cavity, and conduit means coupled to said inlet and extending externally of said vessel to a source of lubricant.

41. The combination of claim 39 wherein said fluid seal means comprises first and second axially spaced fluid sealing devices, the internal volume therebetween defining a second cavity, and further including inlet means and outlet means extending through said casing into said second cavity, inlet conduit means and outlet conduit means coupled respectively to said inlet means and said outlet means and extending externally of said vessel, said inlet conduit means being coupled to a source of a flushing fluid, said outlet conduit means being coupled to a reservoir for said flushing fluid, whereby visual inspection of said flushing fluid exiting from said second cavity via said outlet conduit means enables determination of the integrity of said fluid seal means.

42. The combination of claim 34 wherein said mechanical drive means includes motor means, a gear train unit positioned within said vessel, and a drive shaft coupled between said motor means and said gear train unit.

43. The combination of claim 42 wherein said motor means is positioned externally of said vessel.

44. The combination of claim 42 wherein said gear train unit includes a casing, a pair of driven gears mounted for rotation about a spaced pair of parallel axes, one of said driven gear axes being coaxial with said agitator drive shaft, the corresponding one of said driven gears being coupled to said agitator drive shaft, a driving gear mounted for rotation about an axis perpendicular to said driven gear axes and coaxial with said drive shaft, and intermediate gear means coupled between said driving gear and said driven gears for enabling transfer of mechanical power therebetween.

45. The combination of claim 44 wherein said gears are each provided with bearing means and fluid seal means for preventing contamination of said bearing means by said slurry.

46. The combination of claim 44 further including a second agitator shaft positioned within said slurry vessel and having an axis extending therealong substantially parallel to the axis of the first named agitator shaft, and wherein the other one of said driven gears is coupled to said second agitator shaft.

47. The combination of claim 34 wherein said mechanical drive means includes motor means positioned externally of said vessel, sprocket drive means terminating in said output drive shaft, and flexible power take-off means coupled between said motor means and said sprocket drive means.

48. The combination of claim 47 wherein said flexible power take-off means comprises a chain drive.

49. The combination of claim 22 wherein said initial processing means includes an inlet channel adapted to receive returned concrete mix, classifier means for removing the aggregate constituents from said returned concrete mix, and gravity flow channel means for enabling the aggregate-less returned slurry to flow from said inlet channel into said slurry vessel.

50. The combination of claim 49 wherein said inlet channel comprises a hopper having a central aperture, and an inlet bin lying below said central aperture.

51. The combination of claim 50 wherein said hopper is substantially conical.

52. The combination of claim 50 further including a multiapertured flow restricting means positioned adjacent said central aperture.

53. The combination of claim 50 wherein said gravity flow channel means includes a weir.

54. The combination of claim 49 wherein said classifier means is inclined from the end thereof adjacent said inlet channel to a remote end thereof, said classifier means being pivotally mounted at said remote end to facilitate removal thereof.

55. The combination of claim 54 wherein said classifier means further includes a tail bearing assembly, and link means for coupling said tail bearing assembly to a support portion of said inlet channel.

56. The combination of claim 55 wherein said inlet channel is pivotally coupled to an associated support member so that said inlet channel and said classifier means can be raised as a unit from a normally operative position to an elevated position.

57. The combination of claim 54 wherein said classifier means further includes an inlet end located adjacent said inlet channel, an elevated outlet end, and a hopper positioned adjacent said outlet end for receiving said aggregate constituent.

58. The combination of claim 57 wherein said hopper includes means for sensing the level of accumulated material therein, and further including conveyor means responsive to said hopper level means for removing said materials to a different location.

59. A system for reclaiming returned concrete mix for use in the production of fresh concrete in a ready-mix plant, said system comprising:
an unloading station for receiving returned concrete mix;
means coupled to said unloading station for separating aggregate from said returned concrete mix;
a slurry vessel coupled to said separating means for receiving the resulting slurry remaining after aggregate separation, said slurry vessel having a volumetric capacity sufficiently great to accomodate a predetermined fractional portion of the total average volume of water used to produce fresh concrete during a predetermined production period, said fractional portion being in the range from about one-fifth to about one-half;
means for supplying water to said unloading station and said aggregate separating means;
a source of water coupled to said water supply means;
means for alternating the source of the water supplied to said unloading station and said aggregate separating means between said water source and said vessel, said alternating means including means for sensing the level of the fluid in said slurry vessel, and means responsive to said sensing means for coupling said water source to said unloading station and said aggregate separating means when said fluid level falls below a predetermined level and for coupling clarified water from said slurry vessel to said unloading station and said aggregate separating means when said fluid level is equal to or greater than a higher predetermined level;
means coupled to said slurry vessel for sensing the density of said slurry;
means for supplying slurry from said vessel to said ready-mix plant at a rate determined by said density so that substantially all of the slurry is consumed within a predetermined time period no greater than the slurry curing time; and
means for periodically agitating said slurry for a predetermined duration.

60. The combination of claim 59 wherein said system includes a single pump for supplying water to said unloading station and said aggregate separating means and for supplying slurry from said vessel to said ready-mix plant.

61. The combination of claim 59 wherein said slurry supplying means includes a vortex shedding meter for generating signals representative of the slurry flow rate.

* * * * *